US011138059B2

(12) United States Patent
Wang et al.

(10) Patent No.: US 11,138,059 B2
(45) Date of Patent: Oct. 5, 2021

(54) LOG ANALYSIS IN VECTOR SPACE

(71) Applicant: Juniper Networks, Inc., Sunnyvale, CA (US)

(72) Inventors: Jisheng Wang, Palo Alto, CA (US); Gaurav Sunil Nandode, Jalna (IN); Winson Benedict Fernandes, Karnataka (IN)

(73) Assignee: Juniper Networks, Inc., Sunnyvale, CA (US)

( * ) Notice: Subject to any disclaimer, the term of this patent is extended or adjusted under 35 U.S.C. 154(b) by 33 days.

(21) Appl. No.: 16/583,064

(22) Filed: Sep. 25, 2019

(65) Prior Publication Data

US 2021/0089377 A1    Mar. 25, 2021

(51) Int. Cl.
*G06F 11/07*  (2006.01)
*G06N 20/00*  (2019.01)

(52) U.S. Cl.
CPC ........ *G06F 11/079* (2013.01); *G06F 11/0709* (2013.01); *G06F 11/0775* (2013.01);
(Continued)

(58) Field of Classification Search
CPC ............. G06F 11/0775; G06F 11/0778; G06F 11/079; G06F 11/0793; G06F 11/3072; G06F 11/34; G06F 11/3447; G06F 11/3452; G06F 16/285; G06N 20/00; G06N 3/02; G06N 3/04; G06N 3/0427; G06N 3/0445; G06N 3/08; G06N 3/088; G06N 5/02; G06N 5/025; H04L 41/0604; H04L 41/06;
(Continued)

(56) References Cited

U.S. PATENT DOCUMENTS 5,351,247 A * 9/1994 Dow .................. G06F 11/2257
706/14
6,732,149 B1    5/2004 Kephart
(Continued)

FOREIGN PATENT DOCUMENTS

| EP | 3537658 A1 | 9/2019 |
|---|---|---|
| WO | 2018103453 A1 | 6/2018 |
| WO | 2020142390 A1 | 7/2020 |

OTHER PUBLICATIONS

"Understanding LSTM Networks", Colah's Blog [Online]. Retrieved from the Internet: URL: http: colah.github.io posts2015-08-Understanding-LSTMs , (Aug. 27, 2015), 17 pgs.
(Continued)

*Primary Examiner* — Gabriel Chu
(74) *Attorney, Agent, or Firm* — Shumaker & Sieffert, P.A.

(57) ABSTRACT

The disclosed embodiments provide for identification of a remedial action based on analysis of a system log file. In some example embodiments, messages from the system log file are used as input to generate vectors within a vector space. Portions of the log messages may generate vectors that cluster into a region in the vector space. The region of vector space is associated with one or more remedial actions. The disclosed embodiments are configured, in some example embodiments, to perform the one or more remedial actions when activity in the log file maps to the region of vector space associated with the one or more remedial actions. In some example embodiments, a remedial action can include submitting a problem report to a problem tracking database.

21 Claims, 19 Drawing Sheets

(52) U.S. Cl.
CPC ...... *G06F 11/0778* (2013.01); *G06F 11/0793* (2013.01); *G06N 20/00* (2019.01)

(58) Field of Classification Search
CPC . H04L 41/0627; H04L 41/031; H04L 41/065; H04L 41/0654; H04L 41/069
See application file for complete search history.

(56) References Cited

U.S. PATENT DOCUMENTS

| | | | |
|---|---|---|---|
| 7,383,238 B1* | 6/2008 | Iverson | G06N 20/00 706/25 |
| 10,958,585 B2 | 3/2021 | Safavi | |
| 2007/0006044 A1 | 1/2007 | Dan et al. | |
| 2010/0162045 A1* | 6/2010 | Russ | G06F 11/1479 714/23 |
| 2012/0041575 A1* | 2/2012 | Maeda | G05B 23/024 700/80 |
| 2013/0198565 A1* | 8/2013 | Mancoridis | G06F 21/554 714/26 |
| 2016/0292592 A1 | 10/2016 | Patthak et al. | |
| 2017/0097980 A1* | 4/2017 | Ishii | G06F 16/285 |
| 2017/0208080 A1* | 7/2017 | Sakamoto | G06N 20/00 |
| 2017/0277582 A1* | 9/2017 | Chen | G06F 11/079 |
| 2019/0089599 A1 | 3/2019 | Savalle et al. | |
| 2019/0095266 A1* | 3/2019 | Chen | G06N 5/022 |
| 2019/0095417 A1* | 3/2019 | Xu | G06F 40/216 |
| 2019/0288904 A1 | 9/2019 | Cheng et al. | |

OTHER PUBLICATIONS

"An Overview of Sentence Embedding Methods", http: mlexplained. com 2017 12 28 an-overview-of-sentence-embedding-methods , (Accessed on Nov. 3, 2020), 10 pgs.

Brownlee, Jason, "A Gentle Introduction to Transfer Learning for Deep Learning", Deep Learning for Computer Vision, (Sep. 16, 2019), 31 pgs.

McCormick, Chris, "Word2Vec Tutorial—The Skip-Gram Model", http: mccormickml.com 2016 04 19 word2vec-tutorial-the-skip-gram-model , (Apr. 19, 2016), 17 pgs.

Mubaris, NK, "Word Embeddings-word2vec", https: mubaris.com posts word2vec , (Dec. 14, 2017), 7 pgs.

Pratt, L Y, "Discriminability-Based Transfer between Neural Networks", Advances in Neural Information Processing Systems 5 NIPS 1992, (1992), 8 pgs.

"European Application Serial No. 19213050.8, Extended European Search Report dated Jun. 26, 2020", 10 pgs.

Lin, Qingwei, "Log clustering based problem identification for online service systems", Software Engineering Companion, ACM, 2 Penn Plaza, Suite 701 New York NY 10121-0701 USA, (May 14, 2016), 102-111.

Prosecution History from U.S. Appl. No. 16/237,677, dated Aug. 3, 2020 through Feb. 22, 2021, 51 pp.

U.S. Appl. No. 17/174,800, filed Feb. 12, 2021, naming inventor Safavi.

* cited by examiner

LOG ANALYSIS IN VECTOR SPACE

TECHNICAL FIELD

This application is generally directed to analysis of log files generated by computer systems. Specifically, some embodiments employ machine learning techniques to correlate log file information with a database of known system behaviors.

BACKGROUND

Many computer systems encounter unusual conditions during nominal operation. These conditions may be noted in a log file. Over time a collection of entries is created that describe a variety of conditions occurring during operation of the system. When the system fails to perform its functions normally, the log file may be analyzed to determine a cause of the problem and possible solutions. However, this analysis may occur only after the problem has occurred, resulting in at least some loss of productive capacity of the system. Therefore, improved methods of monitoring computer systems are desired.

BRIEF DESCRIPTION OF THE DRAWINGS

The present disclosure is illustrated by way of example and not limitation in the FIG.s of the accompanying drawings, in which like references indicate similar elements and in which.

DETAILED DESCRIPTION

Figure 1:
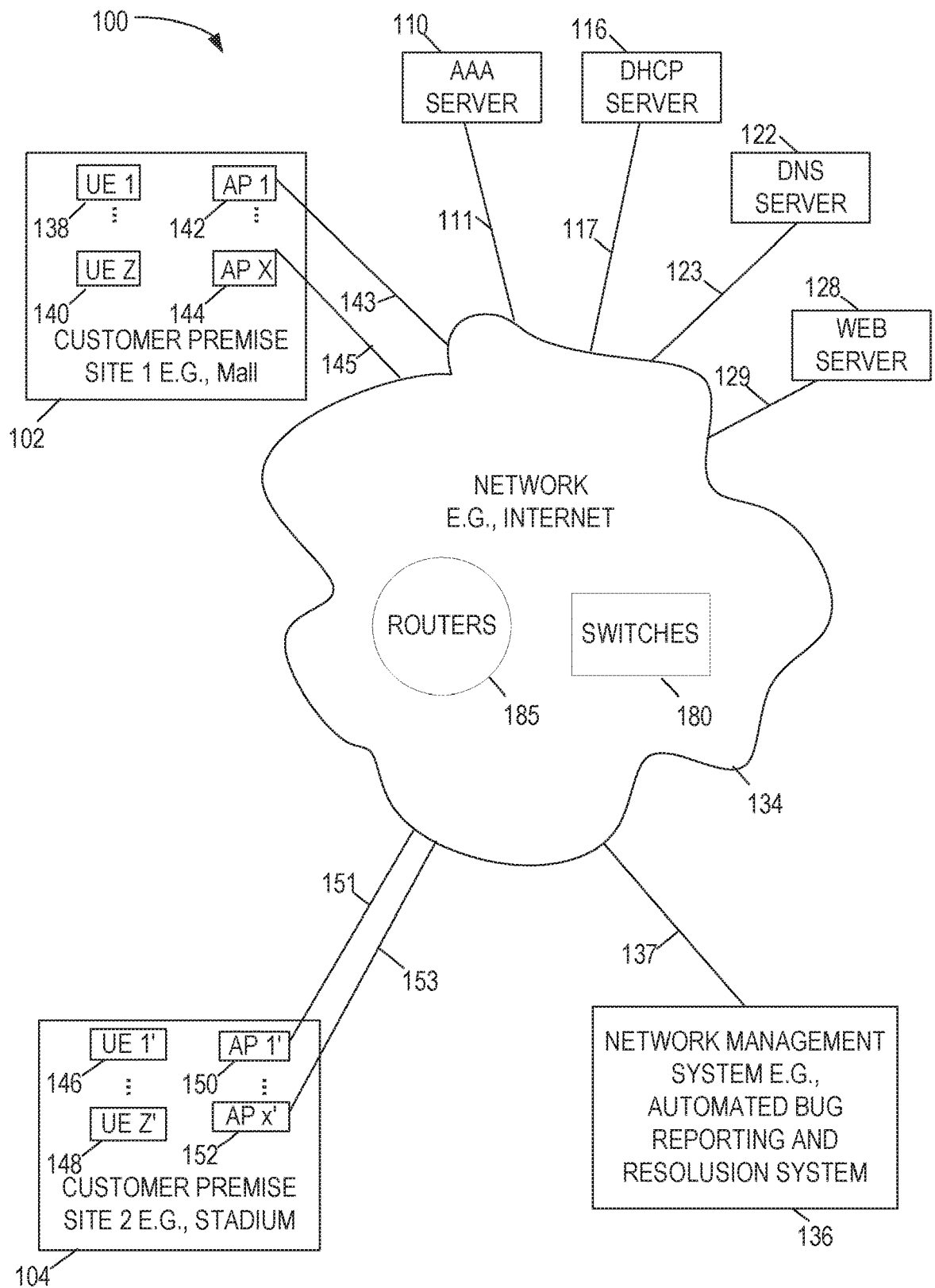
FIG. 1 is an overview diagram of an example system implementing one or more of the disclosed embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Embodiments disclosed provide for analysis and characterization of information provided via log messages of a network system. Networked or distributed systems frequently provide for a system log. The system log records information on system operation during operation. During nominal operation, some log messages may be generated to record operating parameters of the system. During exceptional situations, additional log messages are generated to record information helpful in diagnosing and resolving an issue that may be present.

When problems arise, an engineer responsible for maintaining the networked or distributed system may consult the system log to gain insight into its operation, and to formulate trouble shooting strategies.

The disclosed embodiments provide for analysis of such a system log in vector space. In some embodiments, individual log messages are grouped into blocks of related messages. The grouping may be based on an arrival or generation time of each of the messages. For example, messages within a threshold elapsed time of each other may be grouped into a block. Alternatively, messages may be grouped based on content of the messages themselves. For example, in some aspects, messages generated by a common computer/device, common software component or module, or common subsystem may be grouped into a message block. In some cases, messages are grouped based on the messages meeting multiple criterion (e.g. within an elapsed time of each other and generated by a common device).

The messages may be processed to remove less relevant information from each message. For example, in some aspects, the messages are processed to remove field labels, punctuation, or other less relevant information. A vector is then generated based on content of messages assigned to a message block. As additional messages are assigned to a particular block, the vector for the message block is regenerated.

The vector generated for a message block corresponds to a vector space. In some embodiments, the block of messages is symptomatic of a particular first system problem or issue. By projecting the vector into the vector space, a volume may be defined in the vector space that includes the vector. The volume or cluster may then be associated with the particular system problem or issue. Each particular problem or issue may also have associated with it one or more remedial actions. Thus, the disclosed embodiments may also associate one or more actions with the volume or cluster in vector space.

Thus, if a second block of messages (resulting from a second system issue) is identified with a resulting vector also falling within the defined volume, the disclosed embodiments may infer that a second issue similar to the first issue has presented itself, and that the remedial actions associated with the first issue are also applicable to the second issue.

Thus, the disclosed embodiments provide for improved response time in addressing network or distributed system issues. By projecting messages within a block into a vector space, similar issues may be associated such that common root causes and/or remedial actions may be identified.

FIG. 1 is an overview diagram of an example system 100 implementing one or more of the disclosed embodiments. The example system 100 includes a plurality of access points (AP1 142, ..., AP X 144, AP 1' 150, ..., AP X' 152) wherein an access point can be a wireless access point a router, a switch, or any other device capable of providing network access, a plurality of Authentication, Authorization and Accounting (AAA) servers (only one AAA server 110 is shown by way of example), a plurality of Dynamic Host Configuration Protocol (DHCP) servers (only one DHCP server 116 is shown by way of example), a plurality of Domain Name System (DNS) servers (only one DNS server 122 is shown by way of example), a plurality of Web servers (only one Web server 128 is shown by way of example), and a network management system (NMS) 136, e.g., an automated bug reporting and resolution system (server), which are coupled together via network 134, e.g., the Internet and/or an enterprise intranet. The network 134 consists of numerous routers 185 and numerous switches 180. Network communications links (143, 145, 171, 173) couple the access points (AP1 142, AP X 144, AP 1' 150, AP X' 152) respectively, to network 134. Network communications link 111 couple the AAA servers (only AAA server 110 is shown by way of example) to network 134. The network communications link 117 couples the DHCP servers (only one DHCP server 116 is shown by way of example) to network 134. The network communications link 123 couples the DNS servers (only one DNS server 122 is shown by way of example) to the network 134. The network communications link 129 couples the Web servers (only one Web server 128 is shown) to the network 134. The system 100 further includes a plurality of user equipment devices (UE 1 138, ..., UE Z 140, UE 1' 146, ..., UEZ' 148). The user equipment is any wired, wireless, or optical equipment providing network access to communication devices used by users such as people or automated devices such as IoT devices. Some of the UEs (138, 140, 146, 148) are wireless devices which may move throughout system 100.

System 100 sets of access points are located at different customer premise site. Customer premise site 1 102, e.g., a mall, includes access points (AP 1 142, ..., AP X 144). Customer premise site 2 104, e.g., a stadium, includes access points (AP 1' 150, ..., AP X' 152). As shown by way of example in FIG. 1, UEs (UE 1 138, ..., UE Z 140) are currently located at customer premise site 1 102, UEs (UE 1' 146, ..., UE Z' 148) are currently located at customer premise site 2 104. Each one of the servers, routers, switches, APs, UEs NMS, and other servers attached to the network may, and often do, include a system log or an error log module wherein each one of these devices records the status of the device including normal operational status and error conditions.

Figure 2:
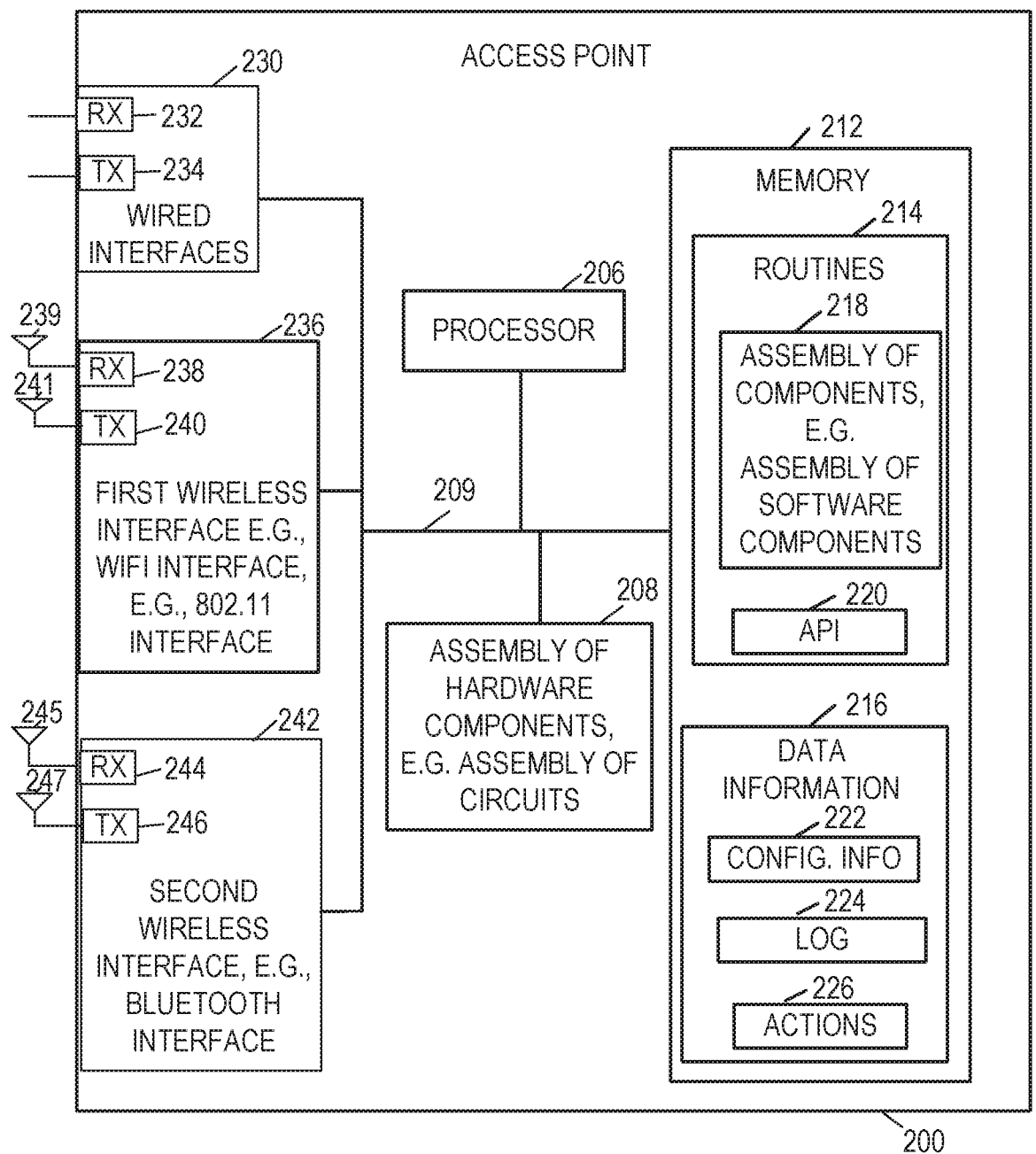
FIG. 2 is a block diagram of an example access point implementing one or more of the disclosed embodiments.

FIG. 2 is a block diagram of an example access point configured to implement one or more of the disclosed embodiments. The access point 200 shown in FIG. 2 may implement any of the access points AP 1 142, ..., APX 144, AP 1' 150, ..., APX' 152 discussed above with respect to FIG. 1.

Access point 200 includes wired interface 230, wireless interfaces 236, 242, a processor 206, e.g., a CPU, a memory 212, and an assembly of components 208, e.g., assembly of hardware components, e.g., assembly of circuits, coupled together via a bus 209 over which the various elements may interchange data and information. Wired interface 230 includes receiver 232 and transmitter 234. The wired interface couples the access point 200 to a network and/or the Internet 134 of FIG. 1. First wireless interface 236, e.g., a wireless a Wi-Fi interface, e.g. 802.11 interface, includes receiver 238 coupled to receive antenna 239, via which the access point may receive wireless signals from communications devices, e.g., wireless terminals, and transmitter 240 coupled to transmit antenna 241 via which the access point may transmit wireless signals to communications devices, e.g., wireless terminals. Second wireless interface 242, e.g., a Bluetooth interface, includes receiver 244 coupled to receive antenna 245, via which the access point may receive wireless signals from communications devices, e.g., wireless terminals, and transmitter 246 coupled to transmit antenna 247 via which the access point may transmit wireless signals to communications devices, e.g., wireless terminals.

Memory 212 includes routines 214 and data/information 216. Routines 214 include assembly of components 218, e.g., an assembly of software components, and Application Programming Interface (API) 220. Data/information 216 includes configuration information 222, device status log including error events and normal events captured as messages in a system log or an error log 224 and collection of remedial actions 226 to be taken in case of discovery of abnormal message flows.

Figure 3A:
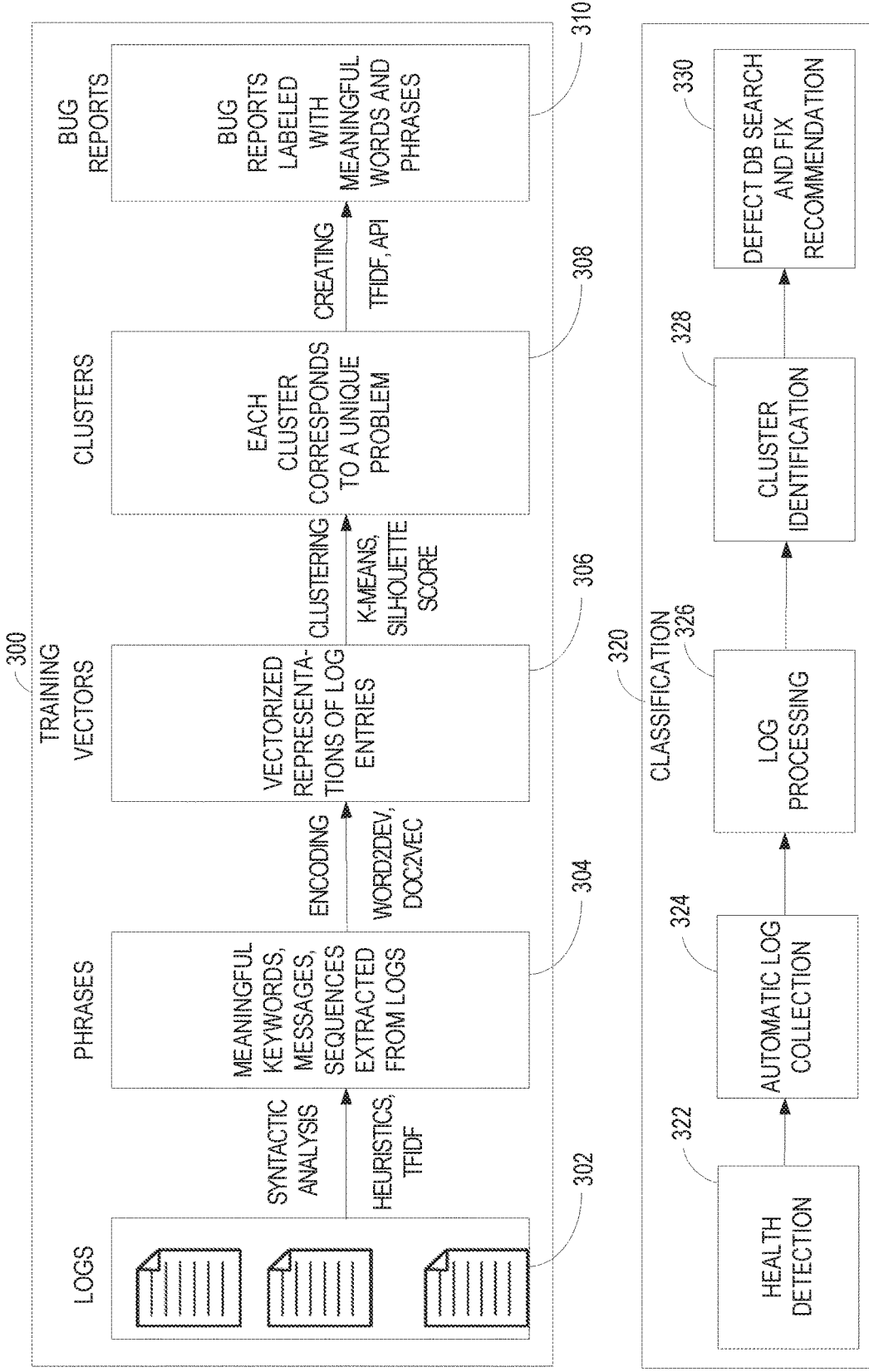
FIG. 3A is a data flow diagram showing processing of log data in one or more of the disclosed embodiments.

FIG. 3A is a data flow diagram showing a model training process 300 and a classification process 320. FIG. 3A shows a set of log files 302. The log files 302 may be generated by one or more network components. As discussed above, the log files store information relating to operation of a networked system. The log file may store information relating to errors and/or normal operation of the networked system. Some of the disclosed embodiments may process the log files 302 to extract data meaningful to the embodiments disclosed herein. As discussed in more detail below, heuristics and algorithms such as term frequency-inverse document frequency (TFIDF) generate a reduced system log of phrases 304 from the log files 302 in some embodiments. The phrases are comprised of meaningful keywords, messages, or sequences of messages extracted from the log files. Meaningful in this context indicates the keywords, messages, or sequences provide indications of root causes of one or more problems that are occurring with the monitored network system. Once the log file has been processed to identify meaningful phrases, the phrases are encoded into a vector space 306. The encoding may be performed by a variety of methods. In some example embodiments, Doc2Vec is used to encode the phrases into vector space. In some other embodiments, Word2Vec is used to encode the phrases into a vector space. The encoding of the phrases into vector space is stateful. In other words, as the encoding progresses, a state of the vector space encoding is maintained, such that subsequent encoding of phrases is influenced by previous encoding of phrases into the vector space.

Once the phrases have been vectorized, clusters 308 of vectors are identified. For example, phrase vectors 306 within a threshold distance of each other may be grouped into clusters 308 in some embodiments. In some embodiments, a centroid in vector space may be determined, with vectors within a threshold distance of the centroid being grouped into a single cluster of clusters 308.

After vectors are clustered into vectors, a determination is made as to whether one or more root causes and/or solutions to problems associated with a particular cluster is determined. This may be accomplished in some example embodiments via interaction with a defects database 310. Issue tracking databases may provide APIs providing for programmatic query and entry of issue reports. One example of an issue tracking database is JIRA. Some of the disclosed embodiments may interface with an issue tracking database to determine if root causes, problem and/or solution is associated with a particular cluster. For example, the issue tracking database may be configured to record locations within the vector space associated with problems, root causes, fixes and/or solutions. If no record is associated with a particular region of vector space corresponding to a cluster of vectors, the disclosed embodiments may generate a new record in the issue tracking database. The new record may store information relating to the cluster, such as log records associated with the cluster, a time associated with the log records, etc.

FIG. 3A also illustrates a data flow from a health detection component 322, automatic log collection component 324, a log processing component 326, cluster identification component 328, to a defect database search and fix recommendation component 330.

Figure 3B:
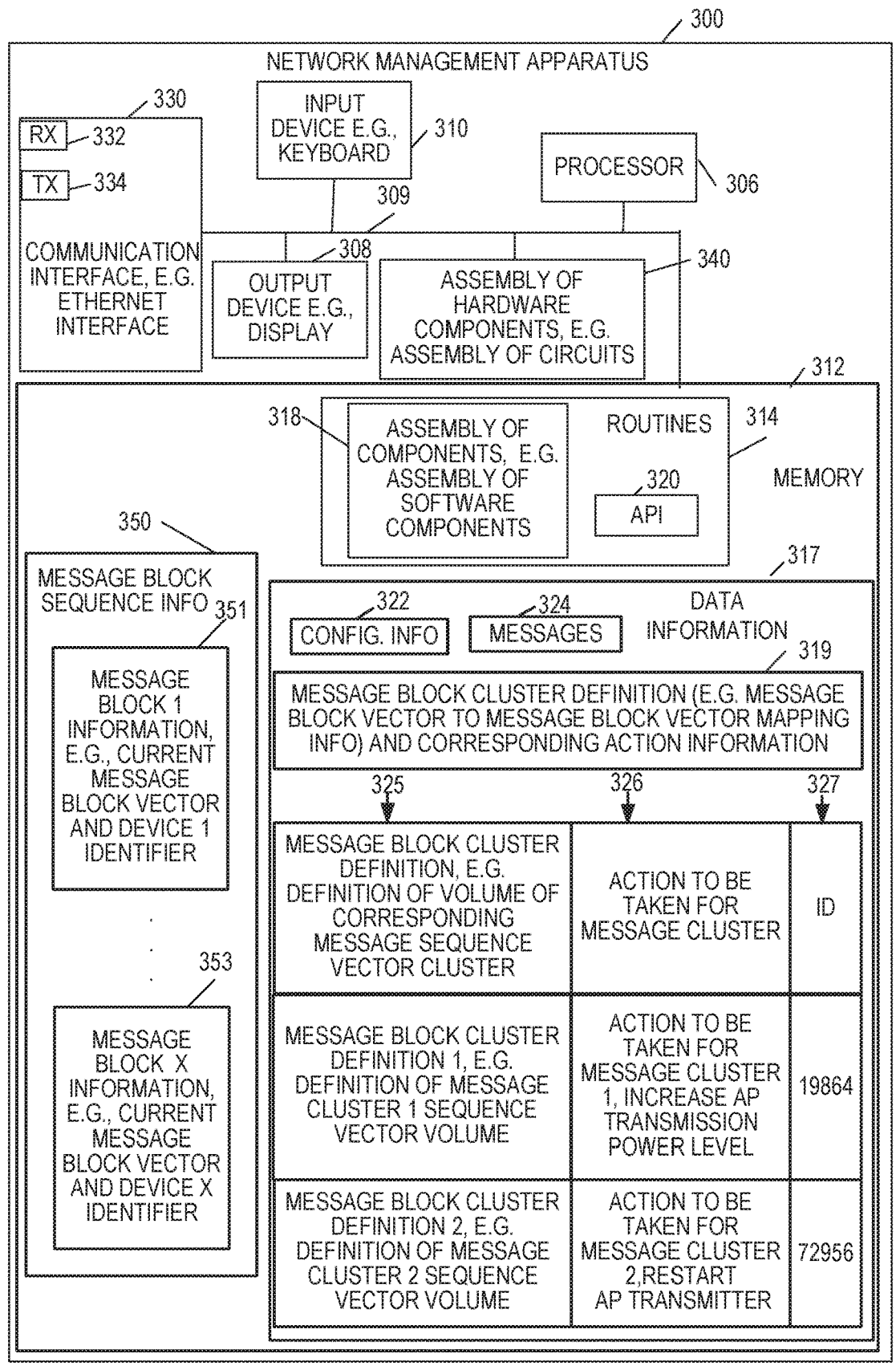
FIG. 3B shows an example network management apparatus.

FIG. 3B shows an example network management apparatus 300. In one or more of the disclosed embodiments, the network management apparatus implements a real-time and/or predictive fault detection network management node. In some embodiments, the network management apparatus 300 is a network management node, e.g., a network management server such as network management automated bug reporting and resolution server. In some embodiments, network management apparatus 300 of FIG. 3B is network management system (NMS) 136 of FIG. 1. In some embodiments the network management apparatus 300 is or is part of an access point such as any one of the access points or devices shown by way of example in FIG. 1.

Network management apparatus 300 includes a communications interface 330, a processor 306, an output device 308, e.g., display, printer, etc., an input device 310, e.g., keyboard, keypad, touch screen, mouse, etc., a memory 312 and an assembly of components 340, e.g., assembly of hardware components, e.g., assembly of circuits, coupled together via a bus 309 over which the various elements may interchange data and information. The communications interface 330 includes an Ethernet interface in some embodiments. Communications interface 330 couples the network monitoring system 300 to a network and/or the Internet. Communications interface 330 includes a receiver 332 via which the network monitoring apparatus can receive data and information, e.g., including service related information, e.g., message such as messages logged in a system log or an error log from a variety of devices such as AAA server, DHCP server, Web server, routers, switches, and a transmitter 334, via which the network monitoring apparatus 300 can send data and information, e.g., including configuration information and instructions, e.g., instructions to access points, routers, switches, or any other server attached to the network, to restart, change operating parameters, download and install another SW version, etc.

Memory 312 includes routines 314 and data/information 317. Routines 314 include assembly of components 318, e.g., an assembly of software components, and Application Programming Interface (API) 320. Data/information 317 includes configuration information 322, captured messages in system log 324 including messages and/or message fields as well as timing information, e.g., the time the message was logged in the system or error log. The memory 312 also includes message block cluster related information 319 including message block cluster definition information 325, action to be taken information 326 and a message block ID 327 for the corresponding cluster. In information 329 the first row provides a heading while each additional row provides information for one message block. For example, the second row corresponds to a message block cluster definition for a first message block cluster represented by or corresponding to a first cluster of message block vectors defined by a volume specified in the first element of second row of information 319. The action to be taken corresponding to when a message block is found to correspond to message block cluster 1, e.g., increase AP transmission power level, is shown by way of example in the second column 326 of row 2 of information 319 and the third column 327 shows that cluster 1 corresponds to tag ID 19864 wherein the tag or ID can serve as a reference entry into a bug tracking system such as JIRA. Row 3 of information 319 includes information for message block cluster 2 including information defining a message block vector cluster, e.g., in terms of a N dimensional volume, corresponding to message block 2 and an indication that message block cluster 2 also corresponds to tag ID 72956 wherein the tag or ID can serve as a reference entry into a bug tracking system such as JIRA service. Additional information and actions may be, and normally are, included in information 319 for other message block corresponding to poor service. Message block definition information for message blocks associated with good service may also be included in information 319 but remedial action information may be, and normally is, omitted for message blocks corresponding to good service which are included in information 319.

The remedial actions may be configured by the system administrator based on past experience. In accordance with some example embodiment, the remedial actions may be downloaded to specific APs. In accordance with other embodiments, the remedial actions are automatically invoked as soon as an abnormal message flow is detected by the messaging model 327 which may reside in memory 312 as well.

The memory 312 also includes message block information 350 for one or more messages sequences, e.g., communications control related message blocks, which are detected. In some embodiments, each message block may identify a device originating the messages included in the block. In some embodiments, the message block may further indicate other devices in communication with the originating device. In some embodiments, message block information 350 includes for each message block, in addition to information identifying the device involved in the message block, a current message block vector value. This value will normally be updated as messages in the corresponding block are received with the value being compared to message block cluster definition information to determine if the message block matches a defined message block cluster as may be indicated by the message block vector of the message block falling within the message block vector cluster volume used to define a message block cluster in the information 319. The message block information 350 is shown by way of example as including message block information (351, . . . , 353) for multiple message blocks, e.g., message block 1 to message block X.

Figure 4:
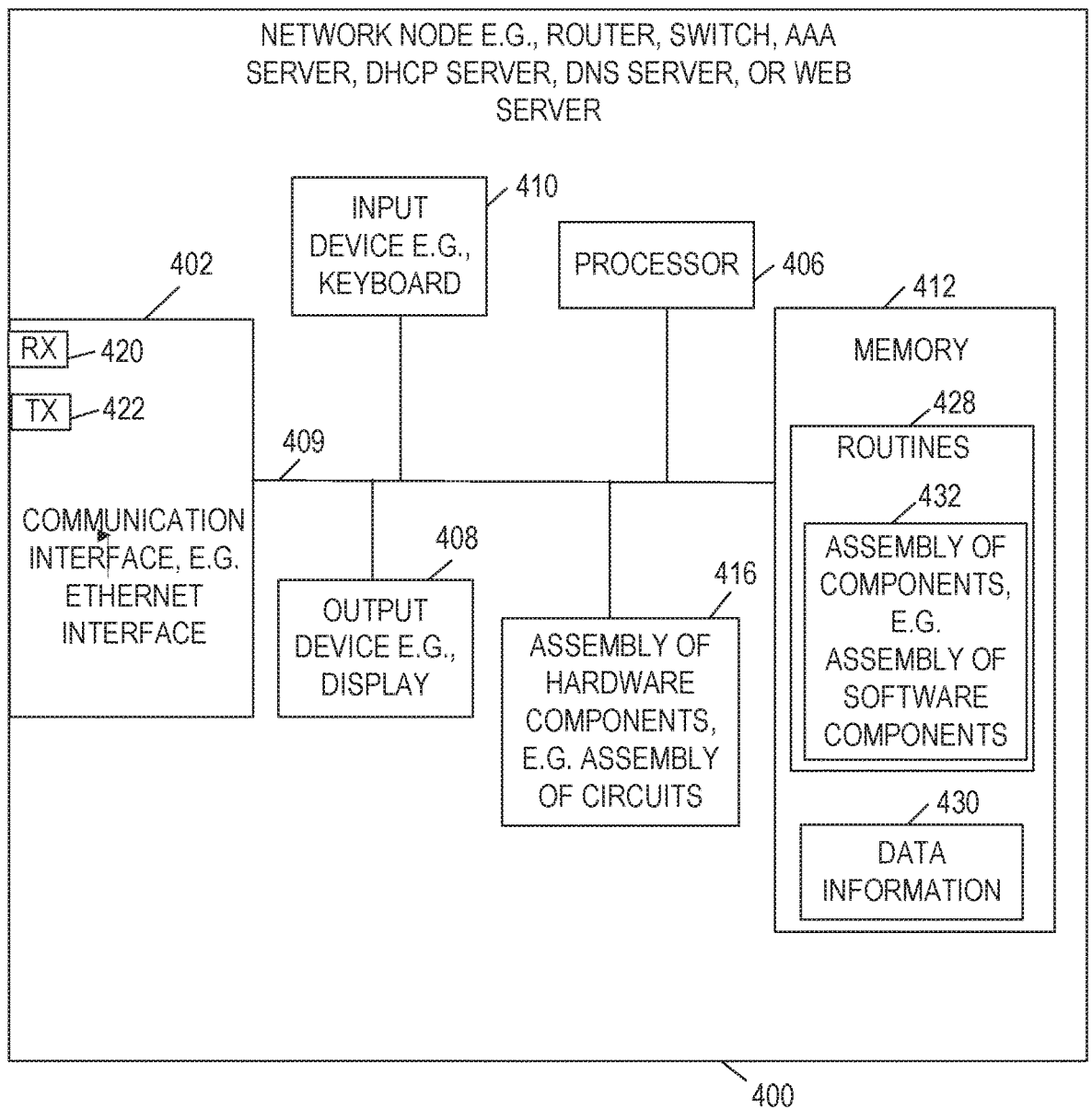
FIG. 4 shows an example network node.

FIG. 4 shows an example network node 400. In one or more of the disclosed embodiments, the network node 400 implements a device or a server attached to the network 134, e.g., router, switch, AAA server, DHCP server, DNS server, Web server, etc., or a network device such as, e.g., routers 185, switches 180, etc. In some embodiments, network node 400 of FIG. 4 is server 110, 116, 122, 128, of FIG. 1 or routers 185, switches 180 of FIG. 1. Network node 400, e.g. a server, includes a communications interface 402, e.g., an Ethernet interface, a processor 406, an output device 408, e.g., display, printer, etc., an input device 410, e.g., keyboard, keypad, touch screen, mouse, etc., a memory 412 and an assembly of components 416, e.g., assembly of hardware module, e.g., assembly of circuits, coupled together via a bus 409 over which the various elements may interchange data and information. Communications interface 402 couples the network node 400 to a network and/or the Internet. Though only one interface is shown by way of example, those skilled in the art should recognize that routers and switches may, and usually do, have multiple communication interfaces. Communications interface 402 includes a receiver 420 via which the network node 400, e.g. a server, can receive data and information, e.g., including operation related information, e.g., registration request, AAA services, DHCP requests, Simple Notification Service (SNS) look-ups, and Web page requests, and a transmitter 422, via which the network node 400, e.g., a server, can send data and information, e.g., including configuration information, authentication information, web page data, etc.

Memory 412 includes routines 428 and data/information 430. Routines 428 include assembly of components 432, e.g., an assembly of software components and data information 430. Data information 430 includes system log and/or error log.

Figure 5:
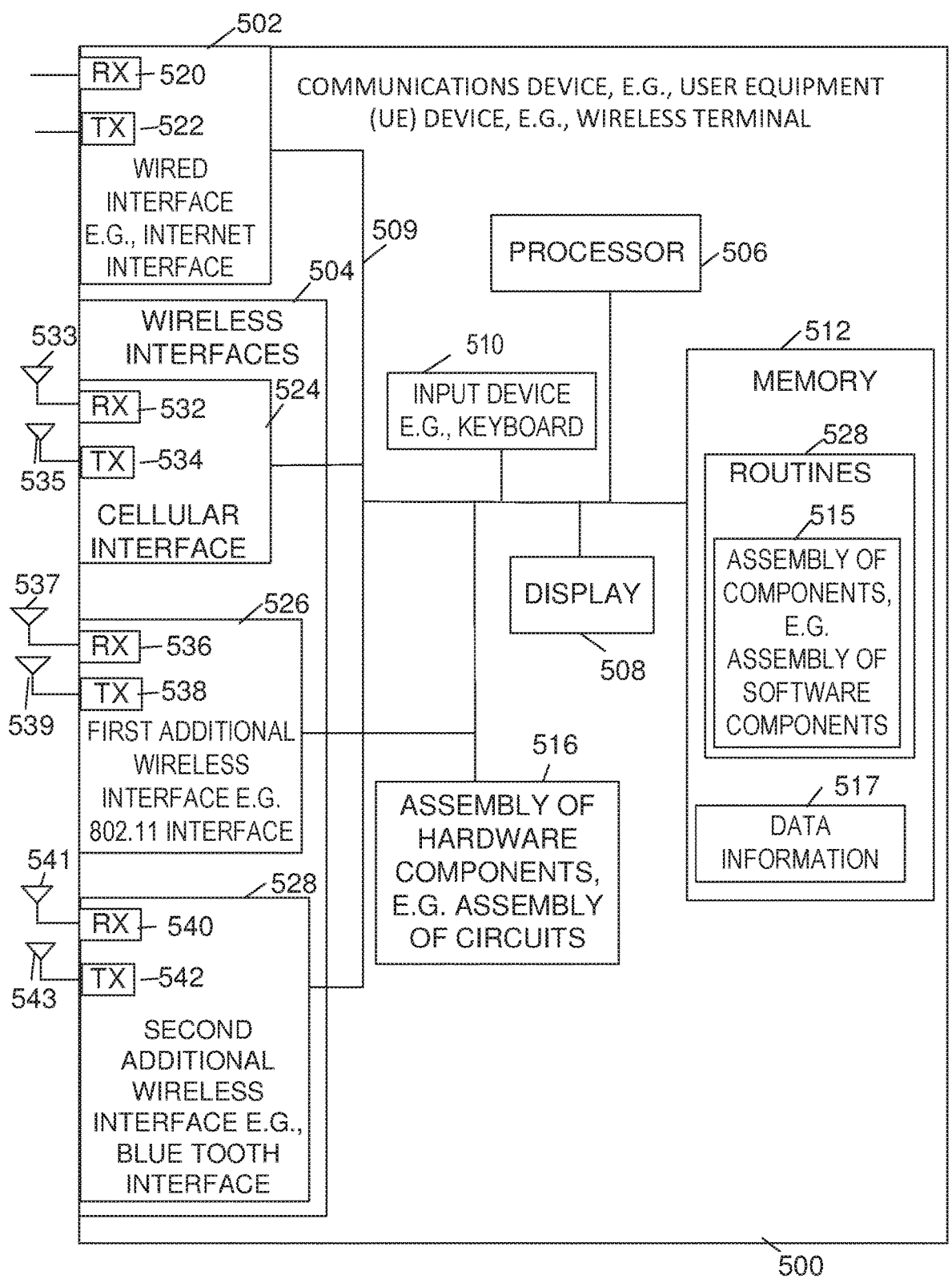
FIG. 5 shows an example communications device.

FIG. 5 shows an example communications device 500. The communications device 500, in one or more of the disclosed embodiments, may implement a user equipment (UE) device, such as any one or more of user equipment UE 1 138, . . . , UE Z 140, UE 1' 146, . . . , or UE Z' 148. Communications device 500, e.g., a UE, includes wired interfaces 502, wireless interfaces 504, a processor 506, e.g., a CPU, a memory 512, and an assembly of components 516, e.g., assembly of hardware module, e.g., assembly of circuits, coupled together via a bus 509 over which the various elements may interchange data and information. Wired interface 502 includes receiver 520 and transmitter 522. The wired interface 502 couples the communications device 500, e.g. a UE, to a network and/or the Internet 134 of FIG. 1.

The wireless interface 504 includes cellular interface 524, first additional wireless interface 526, e.g., 802.11 WiFi interface, and a second additional wireless interface 528, e.g., Bluetooth interface. The cellular interface 524 includes a receiver 532 coupled to receiver antenna 533 via which the communications device 500, e.g. UE, may receive wireless signals from access points, e.g., AP 1 142, . . . , APX 144, AP 1' 150, . . . , APX' 152, and transmitter 534 coupled to transmit antenna 535 via which the communications device 500, e.g. UE, may transmit wireless signals to APs, e.g., AP 1 142, . . . , APX 144, AP 1' 150, . . . , APX' 152. First additional wireless interface 526, e.g., a Wi-Fi interface, e.g. 802.11 interface, includes receiver 536 coupled to receive antenna 537, via which the communications device 500, e.g., UE, may receive wireless signals from communications devices, e.g., APs, and transmitter 538 coupled to transmit antenna 539 via which the communications device 500, e.g., UE, may transmit wireless signals to communications devices, e.g., APs. Second additional wireless interface 528, e.g., a Bluetooth interface, includes receiver 540 coupled to receive antenna 541, via which the communications device 500, e.g. a UE, may receive wireless signals from communications devices, e.g., APs, and transmitter 542 coupled to transmit antenna 543 via which the communications device 500, e.g., a UE, may transmit wireless signals to communications devices, e.g., APs.

Memory 512 includes routines 528 and data/information 517. Routines 528 include assembly of components 515, e.g., an assembly of software components. Data/information 517 may include configuration information as well as any additional information required for normal operations of UE 500. Data information includes also system log or error log.

Figure 6A:
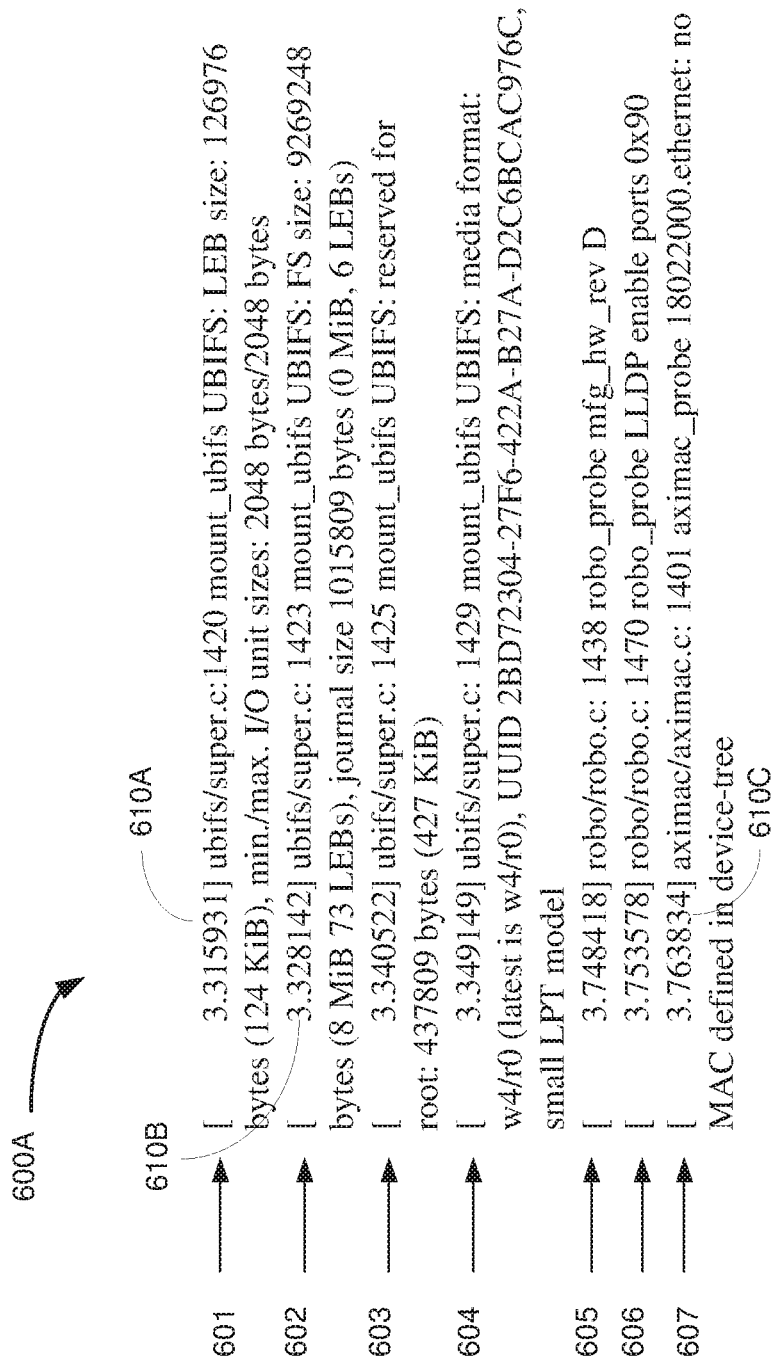
FIG. 6A illustrates example messages 600A that may be included in a system log of one or more devices.

FIG. 6A illustrates example messages 600A that may be included in a system log of one or more devices. The devices may include any one or more of the UE, AP, server, router, switch, etc. in the system of FIG. 1. Each of the messages 601, 602, . . . 607 begins with a timestamp. For example, message 601 begins with the timestamp 610a and message 602 begins with timestamp 610b. Message 607 begins with the timestamp 610c. Other timestamps for the other messages are not specifically identified to preserve FIG. clarity.

Figure 6B:
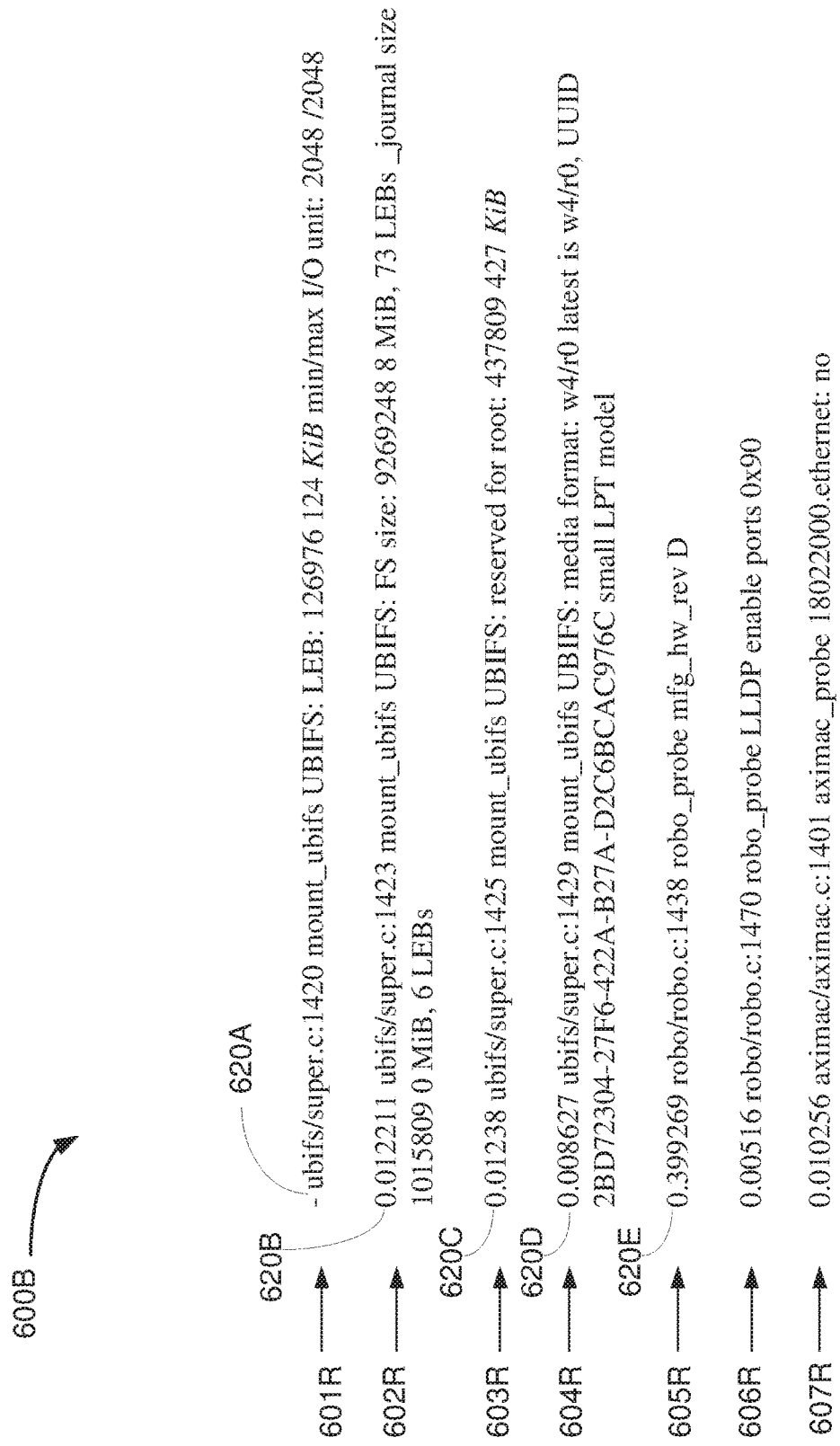
FIG. 6B illustrate example messages from a reduced system log after one or more of the heuristics discussed above are applied to the log entries illustrated in FIG. 6A

FIG. 6B illustrate example messages 600B from a reduced system log after one or more of the heuristics discussed above are applied to the log entries illustrated in FIG. 6A. For example, the timestamps of FIG. 6A, such as timestamps 610a-b, are replaced in the example messages of 600B with a time delta 620b since an immediately previous message. The time stamp 610a from FIG. 6A s replaced with a predetermined special character, illustrated in FIG. 6B as a minus sign (−), identified as 620a. This is a special case for a first message in a log file as represented by message 601 and 601R.

As explained above, the log file may initially include words or terms that make the system log readable by a human. These terms may not be needed in order to fully train a machine learning model to generate results as described herein. For example, where a position in the log file is sufficient to communicate meaning of information, words and/or terms describing the meaning may be removed to reduce the overall size and complexity of the log file. Examples of this are shown when comparing FIG. 6A to FIG. 6B. In FIG. 6A-B, message 601 is mapped into a reduced message 601R, message 602 is mapped into a reduced message 602R, message 603 is mapped into a reduced message 603R, message 604 is mapped into a reduced message 604R, message 605 is mapped into a reduced message 605R, message 606 is mapped into a reduced message 602R, and message 607 is mapped into a reduced message 607R.

Some of the disclosed embodiments analyze a time difference between two messages, shown by way of example in the log file of FIG. 6B as 620b for example. Time deltas between messages 601, 602, and 603 are more closely grouped together than the delta between messages 603 and 604 (shown by way of example with messages 604R and 605R as entries 620d and 620e).

As such the disclosed embodiments may cluster messages 601, 602, and 603 are included in a first block while messages 604, 605, and 607 are included in a second block.

Figure 7A:
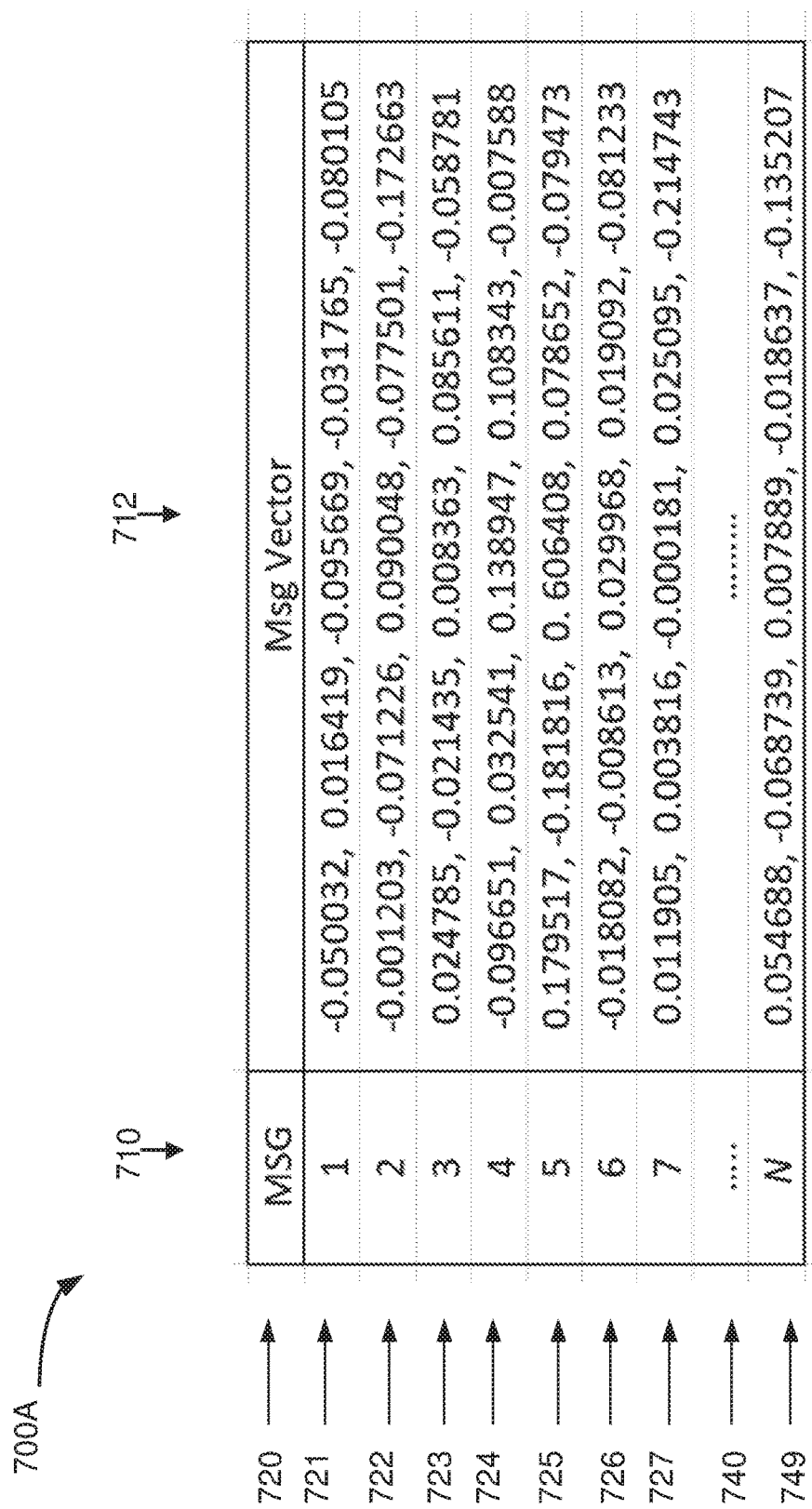
FIG. 7A shows an example table resulting from an analysis of the messages of FIG. 6B.

FIG. 7A shows an example table 700A resulting from an analysis of the messages of 600B. This analysis maps the messages of FIG. 6B with their respective positions in message blocks to a message vector. Each message vector includes a plurality of elements. A value of each element corresponds to one of N dimensions of the reduced message block vector.

In the set of information shown by way of example in table 700A of FIG. 7A, the first row 720 includes headings for each column. The first column 710 stores a message ID of a message. For example, the first message 601R of FIG. 6B may be assigned a message identifier equal to a value of one (1), the second message 602R may be identified with a second message identifier having a value of two (2), etc. Alternatively, in some embodiments, the table 700A may contain the whole message rather than only a messages identifier.

The second column 712 stores vectors for messages, as identified in column 710. Each one of the rows 721, 722, ... 749 stores data derived from a different message of the system log. As explained above, each one of these messages is processed by at least some of the disclosed embodiments to generate the vectors illustrated in column 712. The individual values of each vector are based on a number of times each message appears in the reduced message log and the message's position in the order of messages in the log file. While FIG. 7A illustrates vectors of five (5) dimensions, various embodiments may include vectors of any order and practically dimensionality.

Figure 7B:
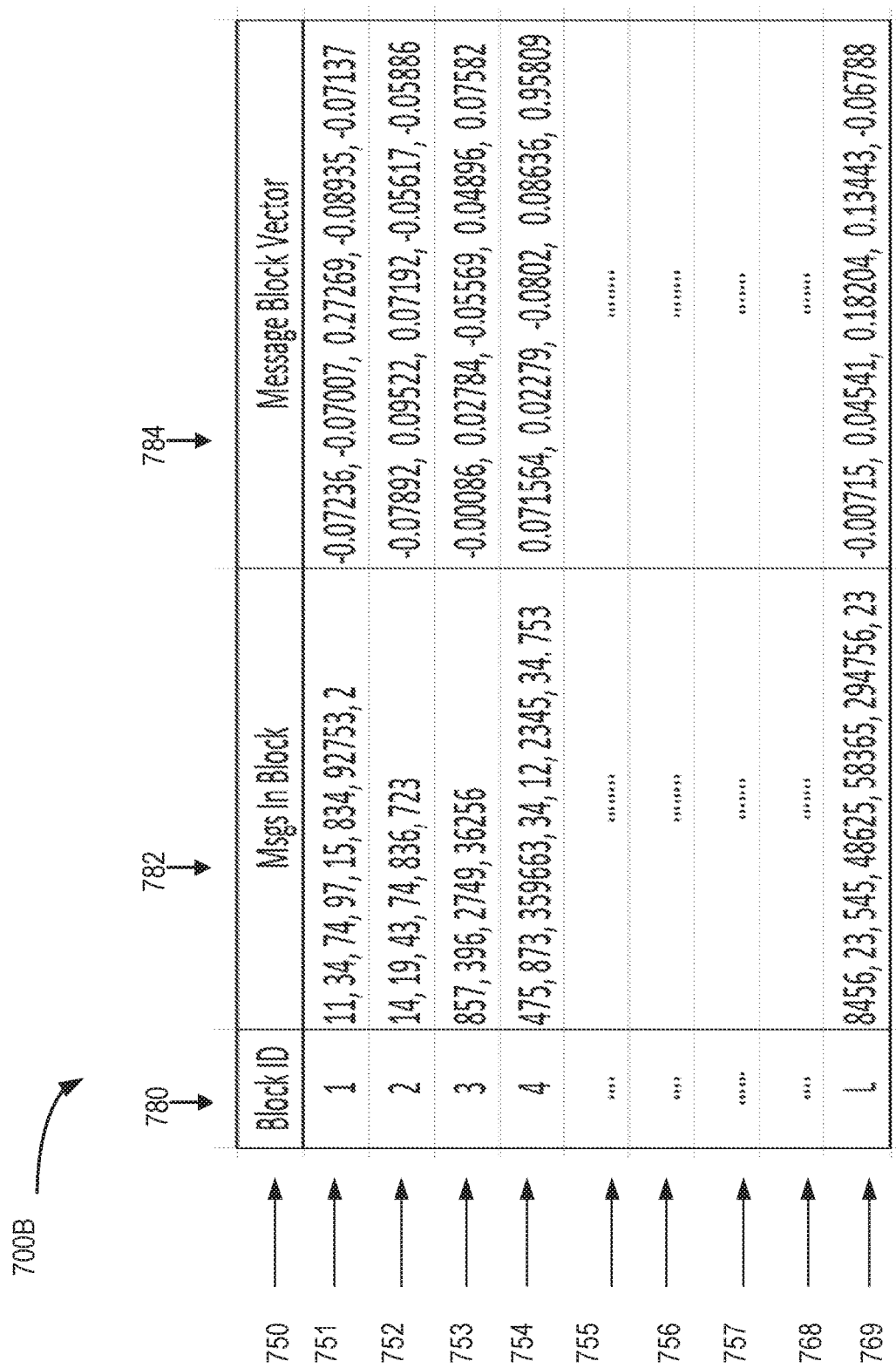
FIG. 7B illustrates an example mapping of message blocks to message block vectors that may be generated by one or more of the disclosed embodiments.

FIG. 7B illustrates an example mapping 700B of message blocks to message block vectors that may be generated by one or more of the disclosed embodiments. Table 700B of FIG. 7B shows a first row 750 includes a heading for each column. A first column 780 provides the message block ID for a message. Column 782 indicates the sequence of messages assigned to the message block identified by column 780. The number of assigned messages in each message block can vary. For example, the first message block 751 includes eight messages, the second message block 752 includes six messages, the third message block 753 includes four messages, and the fourth message block 754 includes eight messages.

A third column 784 indicates a vector generated for the message block identified by column 780. The vector may be generated using machine learning methods as discussed in more detail below. The vector stored in column 784 may include N dimensions; for simplicity and clarity of explanation, FIG. 7B uses N=5.

Figure 8:
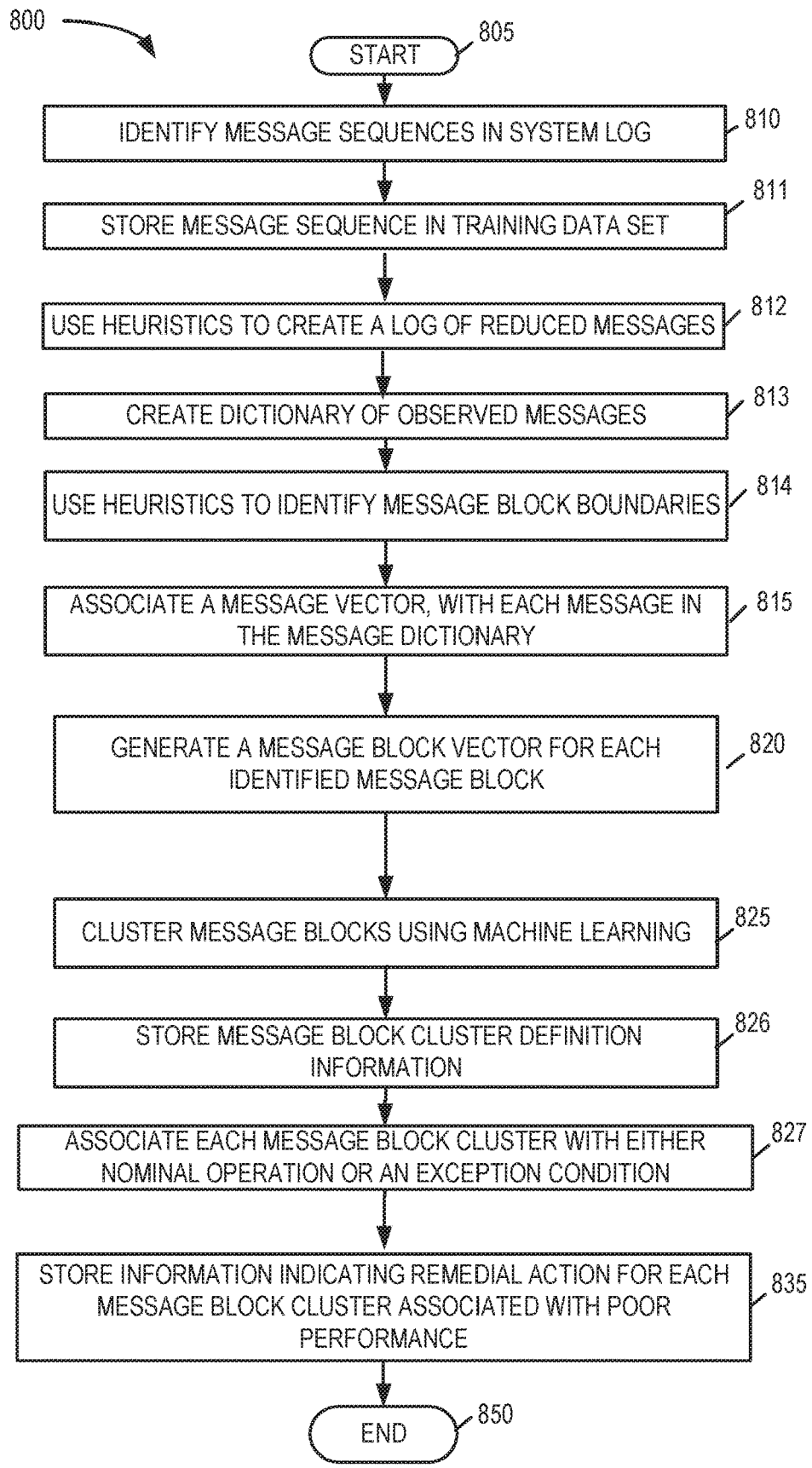
FIG. 8 is a flowchart for a method of training and information storage process.

FIG. 8 is a flowchart 800 for a process of training and information storage process. One or more of the functions discussed below with respect to FIG. 8 and process 800 may be performed by hardware processing circuitry. For example, one or more hardware memories may store instructions that when executed configures the hardware processing circuitry to perform the one or more functions.

Output of the process 800 is used by some of the disclosed embodiments to cluster message blocks and associate message blocks with remedial actions. As explained above, blocks corresponding to a common root cause are grouped into clusters. Each cluster is then assigned a remedial action that may be taken when the cluster is identified in a system being monitored.

Clusters may be identified by their centroid. The centroid may be represented as a vector. In some embodiments, elements of the vector represent average values for block vectors belonging to that cluster. Alternatively, a cluster may be defined by boundaries of a volume in vector space occupied by the cluster. Other embodiments may represent clusters of blocks in some other manner.

Process 800 begins at start operation 805 and then moves to operation 810, which identifies message sequences. In some example embodiments, operation 805 may also determine a position of each message relative to other identified messages.

In operation 811, the identified message sequences are stored in training set data. The training set data may be used later to train a machine learning model.

In operation 812, one or more heuristics are applied to the message sequences to 805. In some example embodiments, the one or more heuristics may remove portions of the messages such as words or terms, that are classified as redundant. For example, in some example embodiments, data within the identified messages may be identified by the data's relative position within the message itself. In this case, a human readable label identifying the data may be redundant or at least unnecessary for further processing. To reduce the size of data processed by embodiments of the present disclosure, this redundant data is removed in some embodiments. An example of the removal of message portions is illustrated above with respect to FIG. 6B relative to FIG. 6A.

In operation 813, a dictionary of observed messages with entries for identified messages is generated. In embodiments that consider message timing, the dictionary may be generated to include information indicating a time when each identified message was created. As discussed above, some embodiments consider an elapsed time between messages when clustering messages into blocks. In some aspects, the dictionary generated in operation 813 may include one or more of the data fields and/or characteristics of dictionary 600B shown by way of example in FIG. 6B.

In operation 814, message block boundaries are identified. For example, as described above, some of the disclosed embodiments may identify message block boundaries based on an elapsed time between messages. For example, messages generated within a first threshold period of time may be assigned to a common block while messages generated after a second threshold period of time may be assigned to different blocks. In some example embodiments, the assignment of messages to message blocks may be dynamically determined. For example, a moving average of elapsed times between a first set of messages may be determined. When a subsequent block is generated at an elapsed time that is more than, for example, one standard deviation from the moving average, the subsequent block may be assigned to a different block that the first set of messages. In some embodiments, the system may use heuristics other than timing between messages. For example in some embodiments, the process 800 identifies predetermined conditions or expressions (e.g. specified by regular expression definitions) that signify the beginning of a message block. These expressions include, but are not limited to "PC is at", or "LR is at.".

In operation 815 a message vector is generated for each message or message/timing combination included in the dictionary. The generated message vector includes N dimensions. Each of the N elements is generated based on particular one or more features of the message. These features may include a frequency of the message, a relative position of the message within a message block, a timing between the message and a preceding message, values of particular fields of the message or other features. In some example embodiments, the message vector is generated using a vectorization library such as Doc2Vec( ) or Word2Vec( ). In these example embodiments, the dimensions of the vector may each be based on an entirety of the message. In some example embodiments, the message vector is stored in a data structure similar to the example of FIG. 6B.

Operation proceeds to operation 820 in which message block vectors for individual message blocks in the training set of data are generated. Message blocks can be written into a system log by a variety of devices. Some message blocks represent nominal operation of a device while other blocks represent exception conditions encountered by a device or system as a whole.

The historical messages in the log are used to facilitate training. In some embodiments prior to training the system monitors messages in the system (or error) log of a specific device. In accordance with another embodiment, all or some of the devices in the network, such as the network of FIG. 1, forward their system log to the network management system 136 of FIG. 1. In accordance with yet another embodiment, devices forward their log to the network management system for analysis only when an error condition is detected. Monitoring of the system log occurs over a period of time. During this period of time, messages belonging to a plurality of different message blocks may be stored.

As discussed above, clustering a portion of the plurality of messages into a single message block may be determined automatically by at least some of the disclosed embodiments. For example, as described above, some embodiments may employ heuristics to cluster messages into blocks or otherwise group messages, for example, based on a creation time of the message(s). Messages clustered in time may be associated with a common message block in some embodiments. In some example embodiments, messages may be clustered according to a technical function or component generating the messages. For example, messages generated by a particular network interface, particular device, or particular software component may be clustered into a first message block while messages generated by a second device, interface, or software component may be clustered into a second message block. Alternatively, manual association of a message to a message block may be performed in some embodiments. For example, a user interface may be displayed, with the user interface configured to receive input indicating the association. FIG. 6B illustrated an example of clustering messages into message blocks based on a creation time of the messages.

In some embodiments, generation of a message block vector for a particular message block is based on a creation date of each of the messages of the block. In some example embodiments, the message block vector may be based on a relative order of the creation dates for each of the messages.

After message block vectors are generated in operation 820, process 800 moves to operation 825, which clusters the message block vectors. Any of a variety of clustering techniques, such as those used for machine learning, can be used to map the message block vectors into clusters in operation 825. In some example embodiments, a machine learning model may be used to cluster message blocks. In some example embodiments, clustering message blocks may include defining centroid points in vector space within a predefined distance of two or more message block vectors. A volume within the vector space may then be defined to encompass the vectors within the predefined distance. The volume then defines the cluster. Any message or message block vectors falling within the defined volume are considered to be included in or associated with the cluster defined by the volume.

The result of the clustering in operation 825 is a plurality of message block cluster definitions such as the message block clusters 317 of FIG. 3B which are stored in operation 826. The message cluster definitions can and sometimes do include an individual value for each of the N elements of a message block vector and a range indicating the permitted deviation from the elements values that can occur with a message still belonging to the cluster.

In some embodiments, the cluster definitions, as discussed above, define a volume within a vector space. Vectors falling within the defined volume are included or associated with the cluster.

In operation 827, each message cluster is associated with nominal system operation or an exception condition. In some example embodiments, nominal operation indicates the monitored system is operating within a service level agreement or within parameters specified by a system specification. Exception conditions may occur when system performance deviates from acceptable parameter values or ranges specified as nominal. This classification of each message cluster may be done automatically in some embodiments. For example, in some example embodiments, service level metrics for communication sessions corresponding to the message blocks in the cluster being below a predefined level used to identify malfunctioning device of the remaining message block clusters which are not deemed to correspond to malfunctioning device can be deemed to correspond to good service level clusters. While the labeling of message block clusters is performed automatically (without human input) in some embodiments. In some other embodiments, manual labeling may be provided to associate message block clusters with classification of system behavior and/or performance.

For a message block cluster associated with an exception condition, most or even all messages included in the message block cluster are likely to be an indication of the exception condition, and may further be indicative of a root cause of the exception condition. As a result, remedial action may be associated with the cluster.

In operation 835, a remedial action, such as actions 326 of FIG. 3B, is associated with at least some of the clusters associated with exception conditions. The association between the clusters and the remedial actions is stored in a database. The database may be relied upon during log file analysis to determine remedial actions to take when a message block cluster is detected.

Thus, process 800 generates information that provides for message blocks to be processed in real time, checked to determine if a message block corresponds to a message block vector cluster for which a remedial action is to be taken. By taking the remedial action in real time, some exception conditions may be ameliorated or avoided. For example, in some cases, "leading indicators" of exception conditions may be detected and ameliorated before a user of the system notices any degradation in performance. This is discussed further below.

Figure 9:
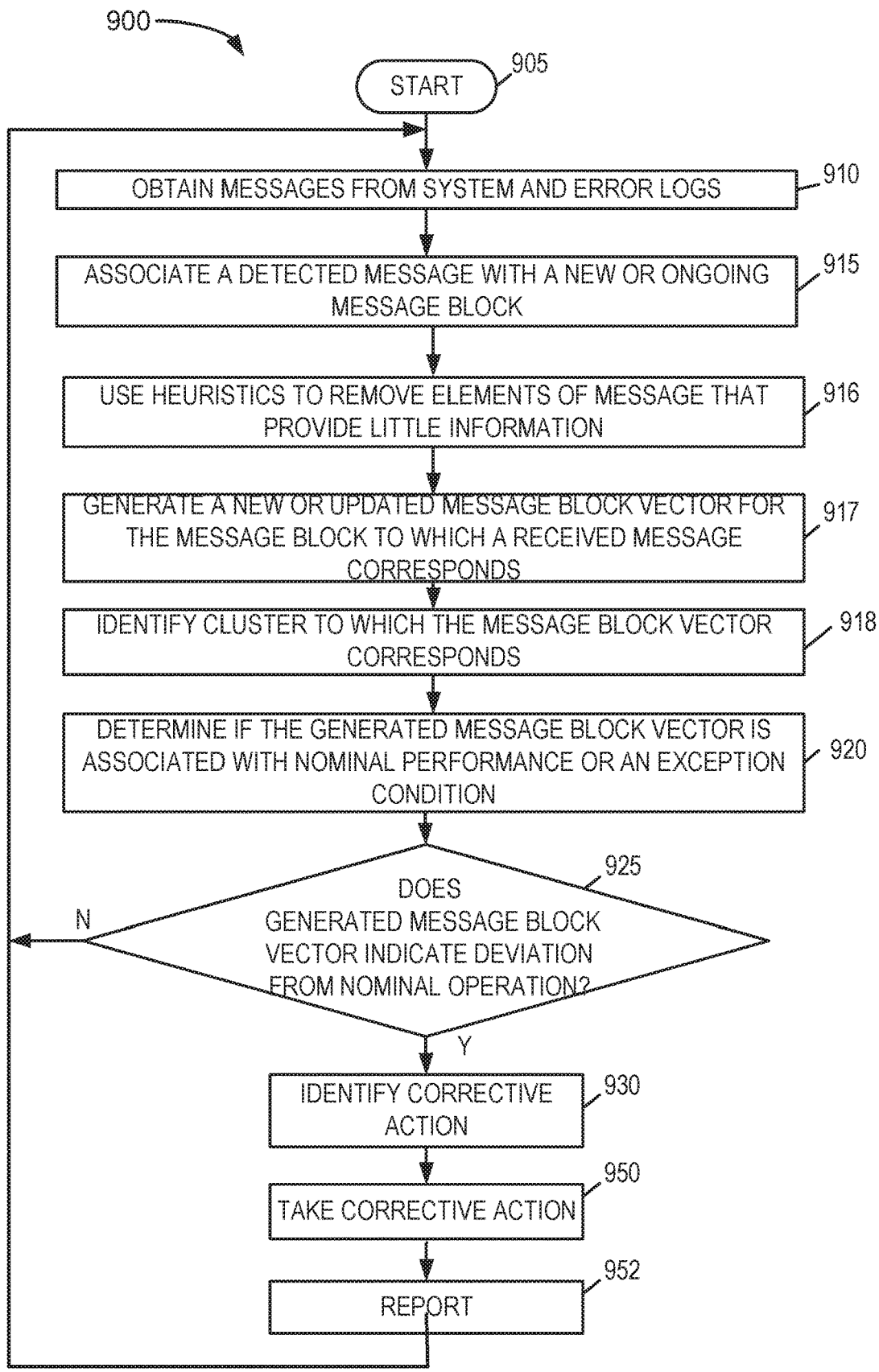
FIG. 9 is a flowchart of a method for detecting message blocks which may be implemented in one or more of the disclosed embodiments.

FIG. 9 is a flowchart of a process for detecting message blocks which may be implemented in one or more of the disclosed embodiments. In some example embodiments, one or more of the functions discussed below may be performed by hardware processing circuitry. In some example embodiments, instructions stored in an electronic hardware memory configures the hardware processing circuitry to perform one or more of the functions discussed below. In some example embodiments, the instructions are included in the network management system 136. In some embodiments, one or more of the functions discussed below with respect to FIG. 9 may be performed by a device that is configured to collect a system or error log or on any other server attached to the network. In some example embodiments, the process 900 may be performed in parallel with storing of messages in a system or error log. In these example embodiments, process 900 may detect and correct, e.g., in real time while logging of a message block is ongoing, faults or problems which can cause poor device or network performance to be encountered by users of network such as the network described in FIG. 1.

The method shown in the flowchart 900 begins with start operation 905 which corresponds to the processor of the network management system beginning to execute instructions, e.g., of a real time monitoring and network management routine executed by the processor 306 of the network management system 300 which can be, and sometimes is, used as the network management system 136 of the system shown by way of example in FIG. 1.

Method 900 proceeds from start operation 905 to operation 910, which obtains messages from a log. The log may be a system or error log. As described above, in some embodiments, the messages from the error log indicate a time the message was logged or created in the log. This indication provides for determining an order and/or elapsed time between messages in a sequence. This timing information is used along with other heuristics to determine a particular message block to which the message corresponds. In at least some embodiments, as previously discussed, individual message blocks correspond to status of specific modules in a particular device. In embodiments where the network management system is implemented as part of a specific device, the system can monitor messages as they are being logged in the system or error log of that specific device.

Detection of a message in monitoring operation 910, which is performed on an ongoing basis, causes operation to proceed with respect to an individual detected message from operation 910 to operation 915. In operation 915 the message detected by the monitoring performed in operation 910, is associated with a new or ongoing message block. In operation 915 if the observed message is a message which starts a new message block, information is stored indicating the specific device and or module from which the message block was logged. The information for each message block is stored and updated when an additional message corresponding to the same message block is detected. Matching of messages to message blocks can be performed by comparing time gap between consecutive messages or by using other heuristics as described above.

Method 900 proceeds to operation 916 in which heuristics such as those described above are applied to the raw messages and are used to strip away message elements that convey little, if any at all, information regarding the underlying status of a specific device or the overall system. Often, the message words or terms that are removed are message elements that have been added to the system or error log to make it readable easier by a person such as an IT technician.

Method 900 proceeds from operation 916, to operation 917, in which a message block vector is updated based on the message. In some example embodiments, generation of a message block vector is stateful. The state is based on previous generation of other messages prior to a current message being processed. In some example embodiments, message block vector generation may be performed in substantial conformance with the process 1100 discussed below with respect to FIG. 11.

Operation 918 determines if the generated message block vector is associated with any defined message block clusters. In some example embodiments, the determination is made by determining if each of the values in the generated message block vector fall within the range of the values used to define a message block cluster. For example, does each one of the N element values of the message block vector fall within a value range of the corresponding element value in the message cluster definition. In some other example embodiments, the disclosed embodiments may define a plurality of volumes within a vector space, each volume associated with a particular message block cluster. The volumes may be defined via a training process in some example embodiments. In these example embodiments, operation 918 determines if a message block vector is associated with a particular message block cluster by determining whether the vectors of the message block vector are contained within a volume associated with the particular message block cluster.

Operation 920 determines whether the generated message block vector corresponds to a message block cluster associated with nominal performance or an exception condition. Decision operation 925 evaluates the cluster. If the cluster is associated with nominal operation, processing returns to operation 910, where an additional message is processed. Otherwise, method 900 moves from decision operation 925 to operation 930 if the cluster is associated with an exception condition.

In operation 930 a corrective action is identified, i.e., the remedial action associated with the message block vector cluster to which the message block was matched is determine by accessing memory, and then in operation 950 the corrective, e.g., remedial action is implemented. The action may, and sometimes also does, include automatically restarting a component or module of a specific device, restarting the whole device, switching to a backup element, changing operating parameters of at least one of the devices, etc. In some embodiments, when no specific remedial action is specified, the method proceeds to operation 950 without taking any specific action.

Operation 900 proceeds from operation 950 to operation 952 where a report is generated and communicated to a user and/or system administrator. In some embodiments, the reporting of operation 952 includes generating a problem, issue, or bug report. The generation of the report may include automatically opening a bug report in a bug reporting tool such as JIRA. The opening of the bug report may further include generating an error message with a recommended action and a reference to other similar root causes. Some embodiments of method 900 may not perform operation 952

In addition, or as an alternative to automatically taking a corrective action in operation 952, some of the disclosed embodiments generate an alert indicating the identification of a problem and potential corrective actions. The alert may be in the form of a text message, SNMP alert message, email message, or pop-up user interface on a terminal of a designated user. For example, a user interface may be displayed in some embodiments on the user display 508 of FIG. 5, notifying a system administrator, e.g., by presenting a message on the display 308 of the NMS 136 of FIG. 1. In this way the user or administrator can be made aware of the problem in an automated way and take a corrective action or implement system maintenance which may be, and sometimes is, in addition to the automatically implemented or recommended corrective action.

The corrective messages may be performed by sending a message to the processor 206 of AP 200 of FIG. 2 and reconfiguring it with new operating parameters, downloading newer SF version, restarting a specific radio in a given AP, as well as restarting one of the APs or one of the network servers. Similarly, the corrective measure may be performed by sending a message to the processor 406 of the offending device 400 such as any malfunctioning server attached to the network, or to the power supply that facilitates the operations of such malfunctioning device.

Operation 900 proceeds from operation 952 to operation 910, where monitoring for a next message is performed.

Operation 900 proceeds from operation 950 to operation 910 in those embodiments where operation 952 is skipped or not preformed.

Figure 10:
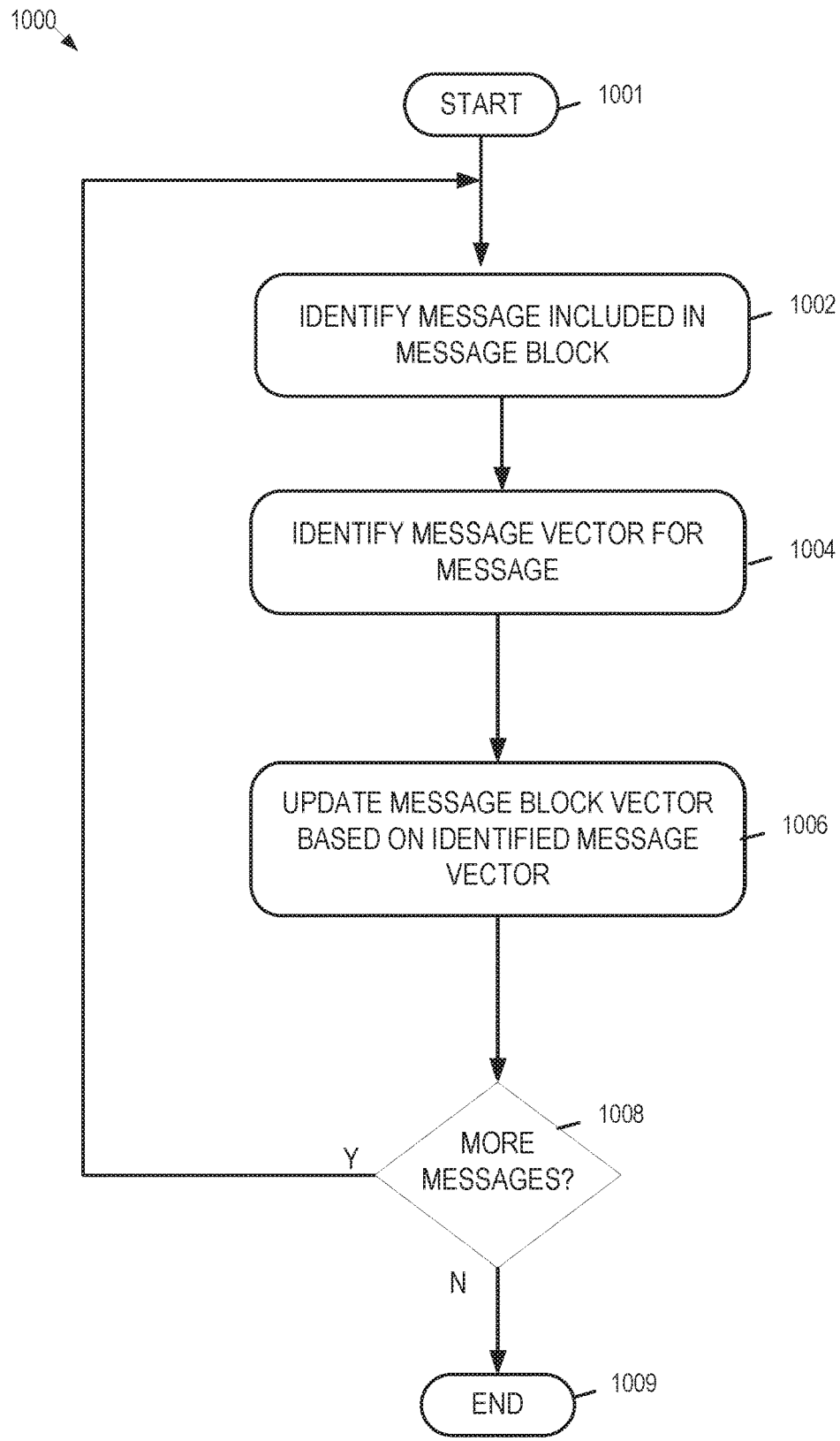
FIG. 10 is a flowchart of a method for generating a message block vector for a block of messages.

FIG. 10 is a flowchart of a method 1000 for generating a message block vector for a block of messages. In some example embodiments, operation 820 of FIG. 8 may perform one or more of the functions discussed below with respect to FIG. 10. Process 1000 generates a message block vector according to messages included in the message block.

After start block 1001, method 1000 moves to operation 1002. In operation 1102, a message included in a message block is identified. In operation 1004, a message vector for the identified message is identified. In operation 1006, a message block vector for the message block is updated based on the message vector identified in operation 1004.

In operation 1006, a vector for the message block is updated based on the message vector identified in operation 1004. In some example embodiments, operation 1006 utilizes a recursive neural network (RNN) to generate the message block vector. The RNN may maintain state information for the message block vector that is relied upon for each iteration of the method 1000.

In various embodiments the message block vector for the message block will include the same number of dimensions and thus the same number of elements and corresponding values as the message vectors used to generate the message block vector. Thus, in some embodiments when N dimensional message vectors are used, the message block vector will also include N dimensions.

Figure 11:
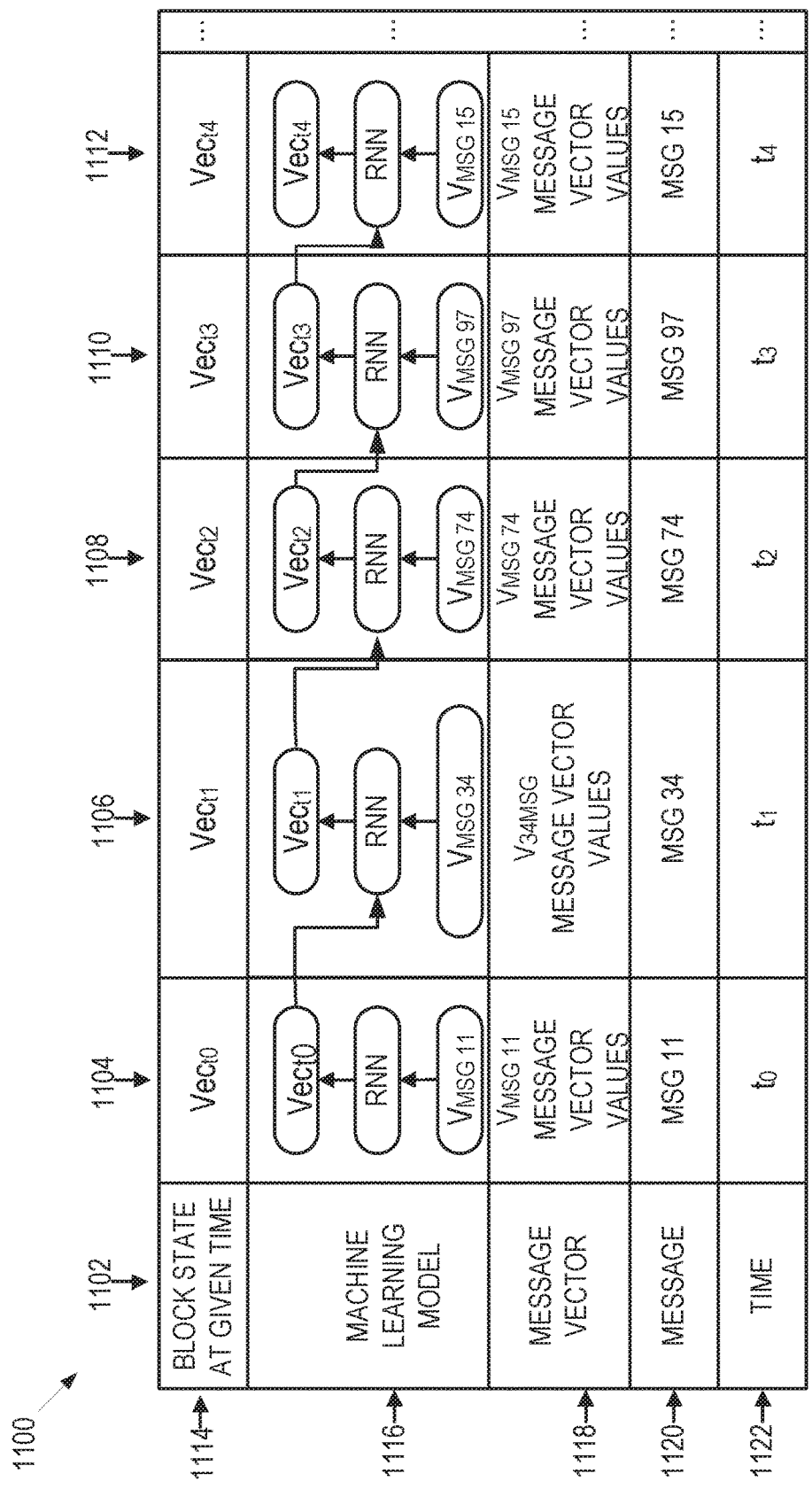
FIG. 11 is a sequence diagram showing how a message block vector is incrementally updated as each message in the block is processed.

FIG. 11 is a sequence diagram 1100 showing how a message block vector is incrementally updated as each message in the block is processed. In some example embodiments, the updating of a message block vector illustrated in FIG. 11 is consistent with operation of method 1000, discussed above with respect to FIG. 10.

Row 1114 and column 1102 of sequence diagram 1100 provide column and row labels to facilitate understanding of the information shown by way of example in each column and row. For example, row 1114 shows the message block state at a given time, in the form of a message block vector Vec which is the updated message block vector for the indicated message time t0, t1, t2, t3 or t4.

Row 1116 shows inputs and outputs of a machine model at a given time. Each column of row 1118 shows a message vector corresponding to a message shown by way of example in the respective column in row 1120, which is the message in the detected block at the time, e.g., message position in the sequence, shown by way of example in row 1122. For sake of illustration the message block in this example is taken from row 751 of FIG. 7B (only the first five messages in the message block are shown by way of example).

Each of the columns 1104, 1106, 1108, 1110, 1112 illustrates processing of a single message in the message block. In some example embodiments, the time order of message processing in sequence table 1100 is equivalent to a second time order of creation of each of the messages in a log. FIG. 11 shows that a message block vector for a time T is used as input to message block vector updating for a time T+1. Thus, as method 1000 of FIG. 10 iterates through messages associated with a single message block, method 1000 updates a message block vector. The state of the message block vector influences generation of a next version of the message block vector.

FIG. 11 illustrates that in response to detecting the message MSG 11 at time t0, method 1000 generates an initial vector using a message vector, $V_{MSG\ 11}$ as an input to an RNN in some example embodiments. Since MSG 11 is a first message in the message block, the RNN has an initial default state when processing the message vector for MSG 11 ($V_{MSG\ 11}$). In some example embodiments, an initial message block vector state is equivalent to zero values at each element of the message block vector. The RNN then generates the corresponding message block vector state, Vect0. A next message, MSG 34 is processed at time t1. A message vector, VMS 34 for the message MSG 34, is provided as input to the RNN, which then generates the state vector Vect1. Note that generation of the state vector $Vect_{T1}$ relies on state generated after processing of the previous message, that is $Vec_{T0}$. Method 1000 continues until all messages associated with the message block are processed.

It should be appreciated that during the training phase complete message blocks are available for processing. However, during use, the message vectors for a message block are generated and updated as individual messages are observed, e.g., in real time, without having to wait for the complete message block to be received (or recorded in the system log) before trying to determine, based on a message block vector, whether or not the message block vector corresponds to a message block vector cluster with which device malfunction is associated and corrective action is also associated.

In some embodiments, a message block vector is set to an initial starting value in response to the start of the message block being detected, e.g., a large time gap between individual messages is detected or by use of other heuristics as described above. Additional messages in the message block are used to update the message block vector for the message block being processed until the full set of messages in the training data base for the detected message blocks have been processed and used to update the message block vector and thereby procure the final message block vector for a message block.

Figure 12A:
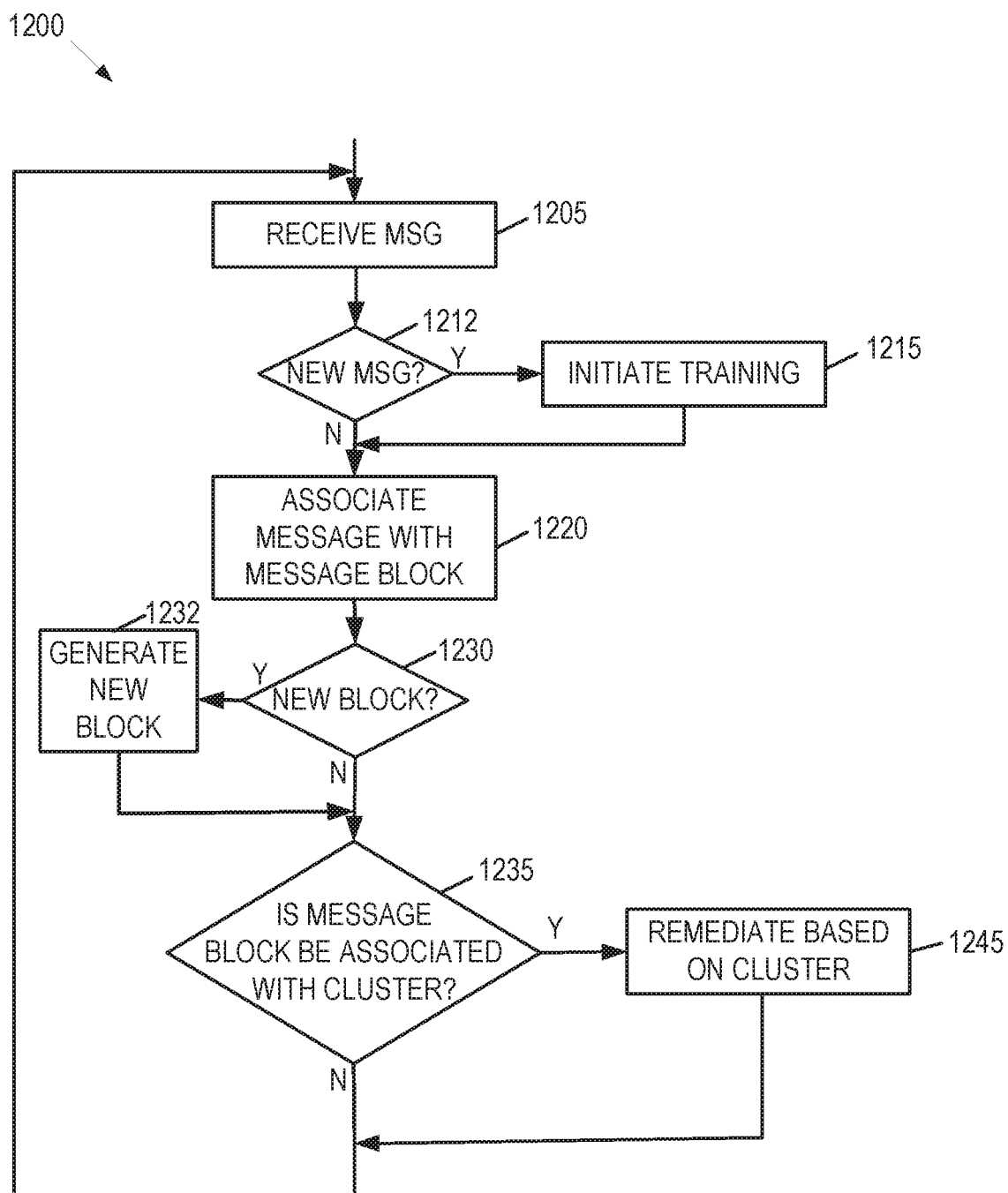
FIG. 12A is a flowchart of an example method for identifying remedial actions to be taken as a result of one or more messages included in a log file.

FIG. 12A is a flowchart of a method for identifying remedial actions to be taken as a result of one or more messages included in a log file. In some example embodiments, method 1200 of FIG. 12 may operate to analyze messages in the log file as the messages are generated. In other words, messages may be processed within a small finite time of their entry into a log file (e.g. less than five seconds, less than one second, less than 30 seconds, etc.). In some example embodiments, an event may be triggered when an entry is made (message is written) to a log file. The event may also initiate operation of method 1200.

Alternatively, the messages may be processed in batch, for example, periodically, such as every 10 minutes, 30 minutes, one hour, etc.

The method starts at operation 1202 and proceeds to operation 1205 where a message is received. The message may be received from a log file, as discussed above. In some example embodiments, receiving a message includes reading the message. The message received in operation 1205 may include any one or more of the fields of any of the messages shown above with respect to FIGS. 6A and/or 6B. In some example embodiments, operation 1205 may include generating a message vector based on the message. The message vector may be generated, in some example embodiments, based on a library providing for vectorization of data. For example, in some example embodiments, the message vector may be generated by Doc2Vec or Word2Vec libraries, although the disclosed embodiments are not limited to these particular vectorization libraries. The vectorization performed in operation 1205 may generate a vector within a vector space. The vectorization may be stateful, in that previous vectorizations affects a result of a vectorization of the received message in 1205. The stateful nature of the vectorization provides for remembering of message context. Thus, for example, if a particular sequence of messages is associated with a particular type of system problem, the stateful nature of the vectorization at least in part, represents this context.

Some of the disclosed embodiments may implement a publish/subscribe model with respect to log file messages. Thus, when a message is published to the log file, a publication event is generated. Subscribers of the publishing event will receive a notification. In these embodiments, method 1200, and specifically operation 1205 may operate in response to receiving the event notification.

Decision operation 1212 determines if the message is a new message. In some example embodiments, decision operation 1212 searches a database of previously processed messages, message blocks, and message clusters for a message equivalent or at least similar to the message received in operation 1205. In some embodiments, the search for a similar message may mask one or more fields of the message that are less important to identifying a similar message. In some aspects, an edit distance may be used to measure similarity between two messages.

If no similar or equivalent message is found by decision operation 1212, method 1200 moves from decision operation 1212 to operation 1215, which initiates a training operation based on the new message. Initiating the training operation may include generating a message vector for the new message and identifying a message block to associate with the message. A description of one embodiment of operation 1215 produces a vector model of message blocks originating from the error log or the system log. This is described with respect to FIG. 8 above. At the conclusion of re-running the training process with the new message, the new message and its corresponding message vector are available for further processing and determination of the corresponding message block vector. In accordance with some embodiments, the newly invoked training process includes identifying a new root cause for an underlying issue and configuring a corresponding remedial action.

In operation 1220, the message received in operation 1205 is associated with a message block. In some embodiments, messages are associated with message blocks via one or more heuristics. For example, as discussed above, messages grouped in time may be associated with a common message block. In some cases, messages sharing an equivalent keyword, source device (a device generating the message), or a subsystem/software component/module generating the message. In some embodiments, combinations of these message attributes may be used by the heuristics to group messages sharing attributes into a message block.

As discussed below with respect to FIG. 13, some embodiments define one or more of message block start, maintain or termination criterion or conditions (e.g. fields 1334, 1336, and/or 1338). Thus, in these embodiments, these conditions are evaluated against the message received in operation 1205 to determine which of the conditions in the block definitions of the block definition table 1330 are met. As described above, the conditions may define a maximum elapsed time between messages included in the block, a device or software component generating the message, a keyword included in the message, or other starting, maintaining, or terminating conditions for a block.

Operation 1230 determines if the message was able to be associated with an existing message block or if a new block is to be generated. If the message is associated with existing message block, the process progresses directly to operation 1235. Otherwise, if the message is associated with an existing message block, process 1200 moves from operation 1230 to operation 1235. If a new block is appropriate, process 1200 moves from decision operation 1230 to operation 1232, which generates a new block and adds the message received in operation 1205 to the new block. Adding a message to a message block includes, in at least some aspects, encoding contents of messages included in the block (including the newly added message) into a vector space, as discussed above. Processing then advances from operation 1232 to decision operation 1235.

Decision operation 1235 determines whether the message block is associated with a message block cluster. In some example embodiments, operation 1235 includes comparing a position within a vector space of the message block that includes the received message to one or more cluster definitions. The cluster definitions define a volume within the vector space. If the message block vector falls within a volume associated with a particular cluster, then decision block 1235 determines that the message block is "associated with" the message block cluster. Thus, a message block is associated with a cluster if a vector resulting from the message block (including the message of 1205) is within a volume defined by the cluster. If the message block is associated with a cluster, process 1200 moves to operation 1245.

In operation 1245, remediation actions associated with the cluster are performed. The remediation actions may include, for example, one or more of a restart of a particular component, change operating parameters, or upgrade a software component from a first version to a second version. The possible remediation actions are not limited to these examples. In some example embodiments, remediating may include submitting a new bug report in a bug reporting database. In some example embodiments, the new bug report may be entered via an API provided by the bug reporting database.

Figure 12B:
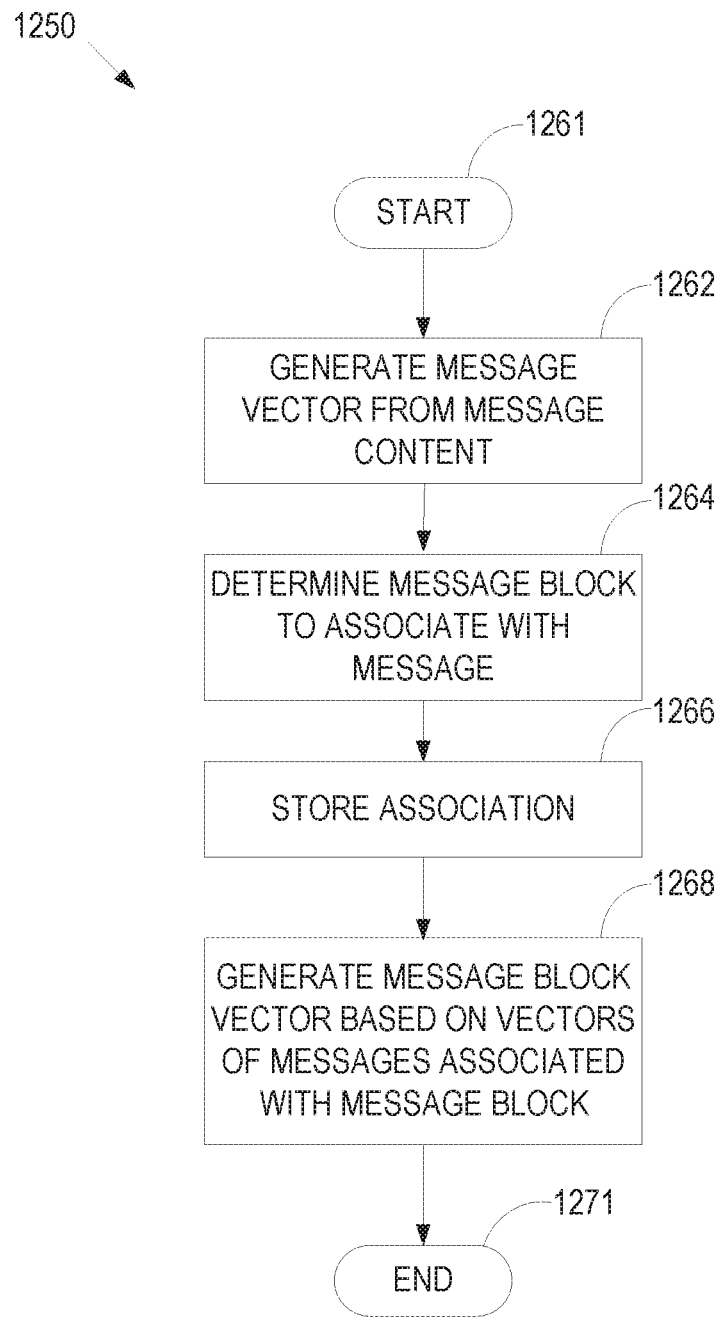
FIG. 12B is a flowchart of an example method for generating a message block vector in some embodiments.

FIG. 12B is a flowchart of a method for generating a message block vector. The event may also initiate operation of method 1250. In some aspects, one or more of the functions discussed below with respect to FIG. 12B are included in operation 1220 of FIG. 12A.

In operation 1262, a message vector is generated from message content. For example, as discussed below content included in a log message may be filtered to remove less relevant information, at least in some embodiments. The remaining content is then provided to a machine learning algorithm to generate a vector in a vector space. In some embodiments, the machine learning algorithm is Word2Vec ( ) or Doc2Vec( ). The message vector is then stored in some embodiments. For example, as discussed below with respect to FIG. 13, some embodiments maintain a message table that uniquely identifies a log message (e.g. table 700A and table 1300 below). The message table stores a message vector generated from contents of the message (e.g. in field 1306).

In operation 1264, a message block to associate with the message (of operation 1262) is determined. In some embodiments, an association between a message and a message block is determined based on one or more criterion. For example, as discussed below with respect to FIG. 13, some embodiments maintain message block definitions, such as those described below with respect to table 1330. The message block definition for a particular block defines, at least in some embodiments, starting criterion for a block (e.g. a message meeting the starting criterion for a block indicates a first message in the block), maintaining criterion (e.g. a message meeting the maintain criterion indicates a message included in the block but not a message that signals either a start of the block or an end to the block), or a termination criterion (e.g. field 1338). Termination criterion defines a message that indicates a last message in a message block.

In operation 1266, the association between the message and the message block is stored. For example, in some embodiments, the association is stored in a data structure similar to the one in table 700B or message table 1300. As discussed below, field 1308 provides for identification of a block associated with a particular message.

In operation 1268, a message block vector is generated based on vectors of messages associated with the block. Thus, operation 1268 identifies any messages associated with the particular message block, and the message vectors that were generated from contents of those messages. These message vectors are used as input when generating a message block vector for the message block. In some embodiments, a machine learning algorithm is used to generate the message block vector. For example, the vectors for individual messages assigned to the message block are provided to the machine learning algorithm, while the machine learning algorithm provides, based on those input vectors and their location in the message block, a message block vector. Such an approach considers a sequence of messages provided to the machine learning algorithm, in that the machine learning algorithm generates different output if an order of two message vectors are swapped. The sequence may be equivalent to a sequence the respective messages were generated in the log.

In some other embodiments, the message block vector is generated by averaging corresponding element values in the message vectors.

Figure 12C:
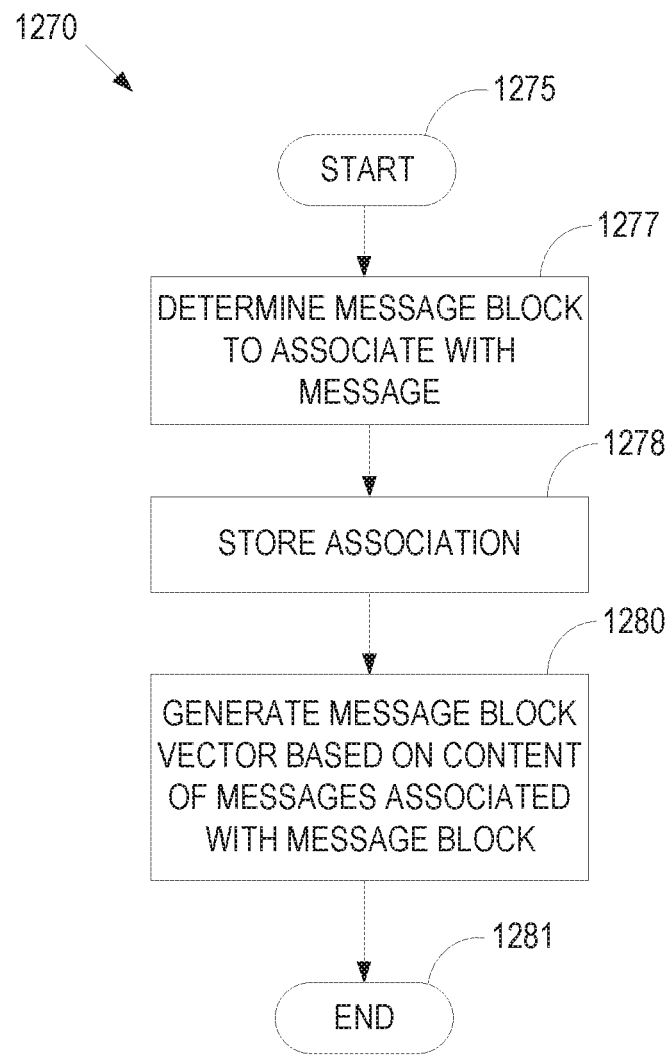
FIG. 12C is a flowchart of an example method for generating a message block vector in some embodiments.

FIG. 12C is a flowchart of a method for generating a message block vector. In some aspects, one or more of the functions discussed below with respect to FIG. 12C are included in operation 1220 of FIG. 12A.

After start operation 1275, process 1270 moves to operation 1277, which determines a message block to associate with a message. As discussed above with respect to at least FIG. 12B, in some embodiments, an association between a message and a message block is determined based on one or more criterion. For example, as discussed below with respect to FIG. 13, some embodiments maintain message block definitions, such as those described below with respect to table 1330. The message block definition for a particular block defines, at least in some embodiments, starting criterion for a block (e.g. a message meeting the starting criterion for a block indicates a first message in the block), maintaining criterion (e.g. a message meeting the maintain criterion indicates a message included in the block but not a message that signals either a start of the block or an end to the block), or a termination criterion (e.g. field 1338). Termination criterion defines a message that indicates a last message in a message block. In some embodiments, messages grouped in time are associated with a message block. In some embodiments, messages generated by a common device or software module are associated with a common message block.

In operation 1278, the association between the message and the message block is stored. For example, in some embodiments, the association is stored in a data structure similar to the message table 1300. As discussed below, field 1308 provides for identification of a block associated with a particular message.

In operation 1280, a message block vector is generated based on contents of messages associated with the message block. Thus, in some embodiments, contents of the messages are provided as input to a machine learning model (e.g. Doc2Vec( ) or Word2Vec( )), which generates as output the message block vector. Operation 1280 contrasts with operation 1268, in that the contents of the messages are not mapped into a vector first before generating the message block vector. In other words, in operation 1280, the message block vector is not based on message vectors, as was the case in operation 1268. After operation 1281, process 1270 ends at operation 1281.

Figure 13:
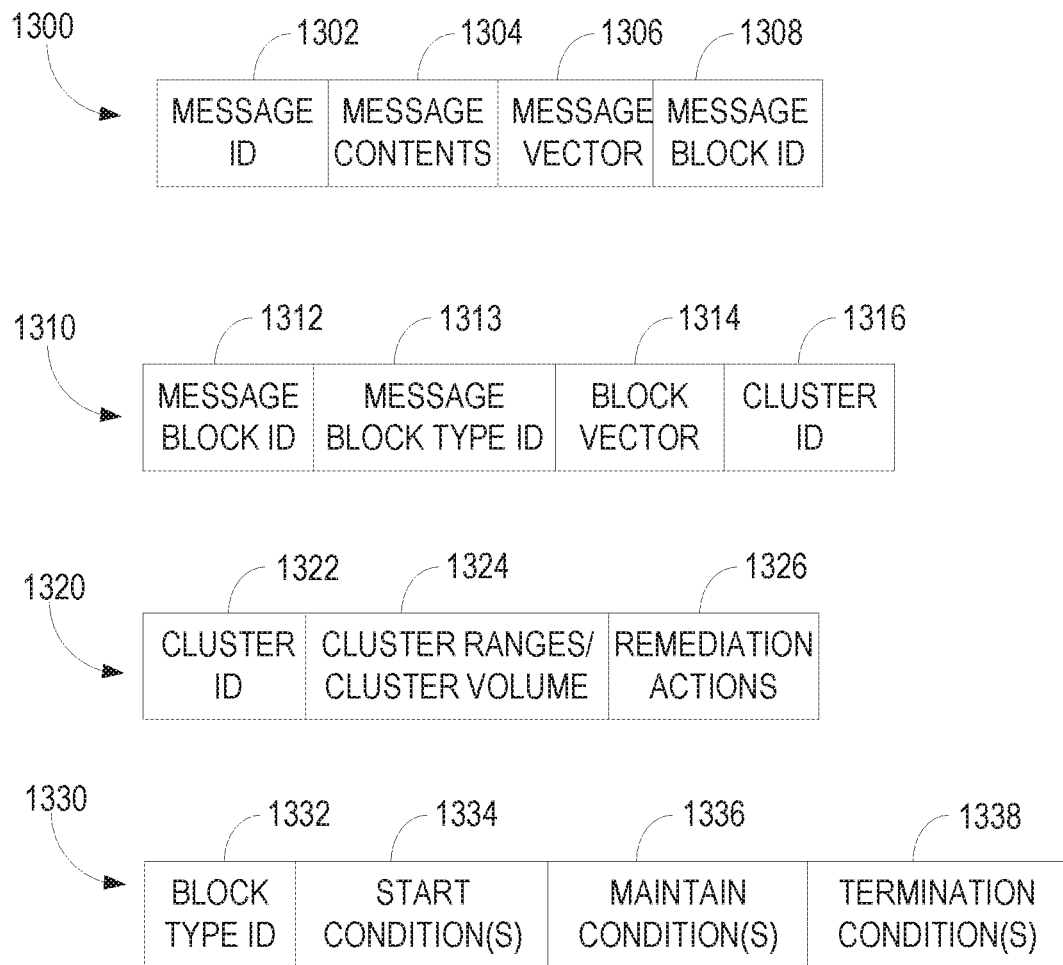
FIG. 13 illustrates example data structures that may be implemented by one or more of the disclosed embodiments.

FIG. 13 illustrates example data structures that may be implemented by one or more of the disclosed embodiments. While the discussion below of FIG. 13 refers to the illustrated data structures as relational database tables, one of skill would understand that various embodiments could organize data using a variety of techniques, including for example, non-structured data stores, traditional memory structures such as linked lists, trees, graphs, arrays, or other structures, and the disclosed embodiments are not limited to any particular data structure organization.

FIG. 13 illustrates a message table 1300, message block table 1310, a cluster table 1320 and a message block definition table 1330. In some example embodiments, one or more of the message table 1300, message block table 1310, cluster table 1320, or message block definition table 1330 may be stored in the mass storage 1416.

The message table 1300 includes a message identifier 1302, message contents field 1304, message vector field 1306, and a message block identifier field 1308. The message identifier field 1302 uniquely identifies a particular message. The message contents field 1304 stores values of one or more fields of the message. For example, the message contents field 1304 may store one or more of the message fields discussed above with respect to FIGS. 6A-B. The message vector field 1306 stores a message vector for the message identified by the message identifier field 1302 and/or message contents field 1306. The message block identifier field 1308 identifies a message block with which the message is associated. The message block identifier field 1308 may be cross referenced with the message block identifier field 1312, discussed below.

The message block table 1310 includes a message block identifier field 1312, message block type identifier 1313, block vector field 1314, and a cluster identifier field 1316. The message block identifier field 1312 uniquely identifies a message block. The message block type identifier field 1313 identifies a type of block identified by the message block identifier field 1312. For example, in some embodiments, the message block type identifier field 1313 cross-references a message block type (e.g. via field 1332 discussed below) in the message block type definitions table 1330. The block vector field 1314 stores values defining a vector in vector space. The vector is generated based on contents of messages included in the message block. The cluster identifier 1316 identifies a message block cluster with which the message block (identified via 1312) is associated. The cluster identifier field 1316 may be cross referenced with the cluster identifier field 1322, discussed below.

The cluster table 1320 includes a cluster identifier field 1322, cluster ranges field 1324, and remediation action fields 1326. The cluster identifier field 1322 uniquely identifies a message block cluster, and may be cross referenced with the cluster identifier field 1316. The cluster ranges field 1324 defines value ranges for one or more dimensions of a message vector in some example embodiments. In these example embodiments, if a message block vector's dimension values fall within the ranges specified by the cluster ranges/cluster volume field 1324, the corresponding message block associated with the message block vector may also be associated with the cluster (identified via the cluster ID field 1322). In some other example embodiments, the cluster ranges/cluster volume field 1324 defines a volume in vector space associated with the cluster identified via cluster identifier 1322. Message block vectors positioned within the volume defined by the cluster ranges/cluster volume field 1324 are considered by the disclosed embodiments to be "associated" with the cluster. Thus, when message blocks mapping to these message block vectors are encountered by the disclosed embodiments, they may cause invocation of remedial action(s) 1226 associated with the cluster, as described below.

The remediation action(s) field 1326 identifies one or more remediation actions that may be performed when an event associated with the cluster (identified via cluster ID field 1322) is detected. The remediation actions may include one or more of restarting or resetting a component or a device, changing operating parameters of one or more components or devices, upgrading software running on one or more network components or devices, opening an issue report in an issue tracking database, notifying a system administrator, or other remediation actions.

The message block definition table 1330 stores conditions that define the boundaries of message blocks. The message block definition table 1330 includes a block type id field 1332, start condition(s) field 1334, maintain condition(s) field 1336, and a termination condition(s) field 1338. The block type identifier field 1332 uniquely identifies a particular block type, i.e. a block defined by the conditions in the fields 1334, 1336, and 1338. The start condition(s) field 1334 identifies one or more criterion or conditions that indicate the start of a message block. Some of the disclosed aspects may evaluate the conditions defined by the start condition(s) field 1334 to detect a beginning of a message block of the type identified by the block type identifier field 1332. The maintain condition(s) field 1336 define conditions for a message that provide for the message to be included in a block of the type defined by the block type identifier field 1332. The termination condition(s) field 1338 defines criterion or conditions that define an end of a block of the type identified by the block type identifier field 1332.

Figure 14:
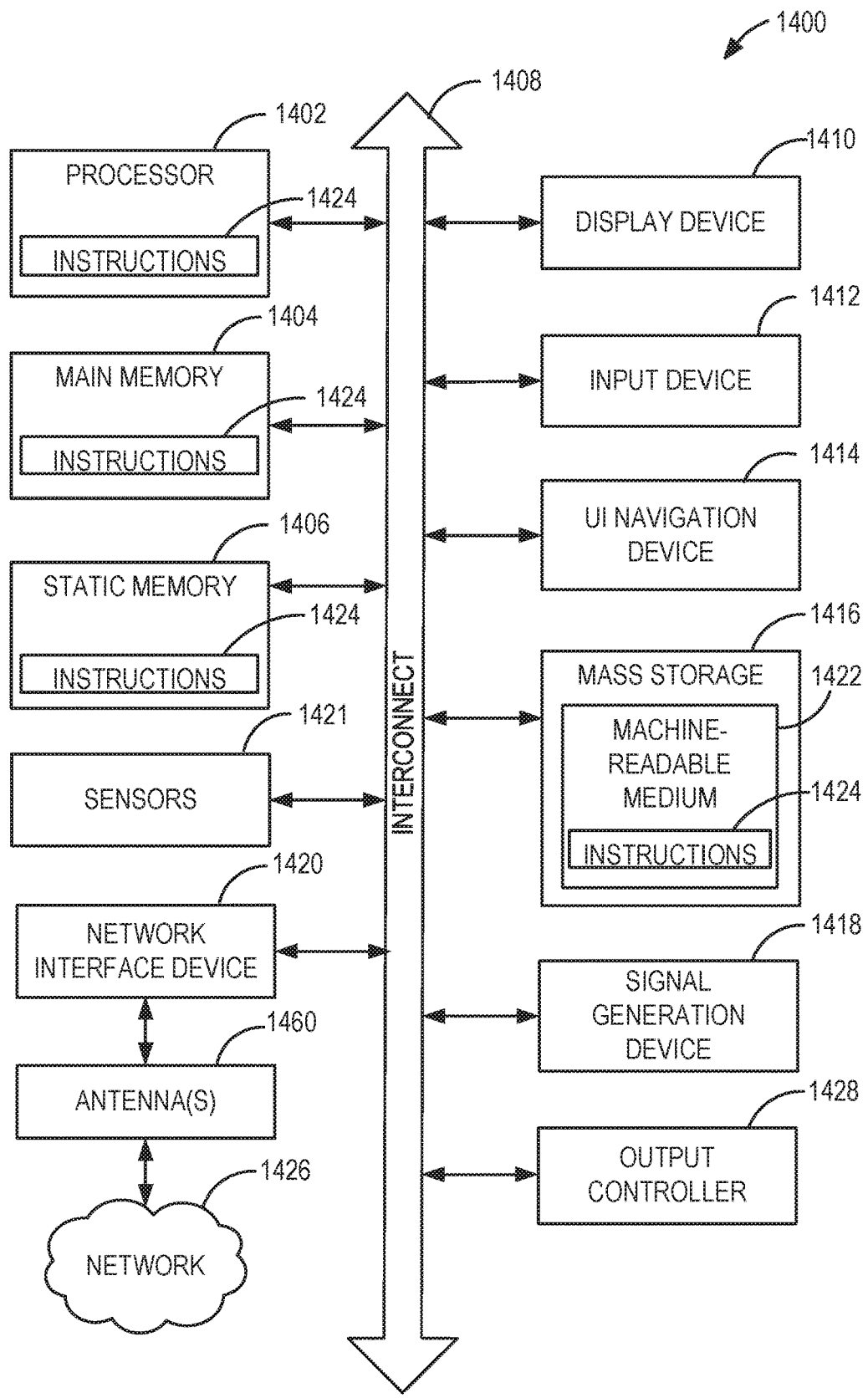
FIG. 14 illustrates a block diagram of an example machine upon which any one or more of the techniques (e.g., methodologies) discussed herein may perform.

FIG. 14 illustrates a block diagram of an example machine 1400 upon which any one or more of the techniques (e.g., methodologies) discussed herein may perform. Machine (e.g., computer system) 1400 may include a hardware processor 1402 (e.g., a central processing unit (CPU), a graphics processing unit (GPU), a hardware processor core, or any combination thereof), a main memory 1404 and a static memory 1406, some or all of which may communicate with each other via an interlink (e.g., bus) 1408.

Specific examples of main memory 1404 include Random Access Memory (RAM), and semiconductor memory devices, which may include, in some embodiments, storage locations in semiconductors such as registers. Specific examples of static memory 1406 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 1400 may further include a display device 1410, an input device 1412 (e.g., a keyboard), and a user interface (UI) navigation device 1414 (e.g., a mouse). In an example, the display device 1410, input device 1412 and UI navigation device 1414 may be a touch screen display. The machine 1400 may additionally include a mass storage (e.g., drive unit) 1416, a signal generation device 1418 (e.g., a speaker), a network interface device 1420, and one or more sensors 1421, such as a global positioning system (GPS) sensor, compass, accelerometer, or any other sensor. The machine 1400 may include an output controller 1428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 1402 and/or instructions 1424 may comprise processing circuitry and/or transceiver circuitry.

The storage device 1416 may include a machine readable medium 1422 on which is stored one or more sets of data structures or instructions 1424 (e.g., software) embodying or utilized by any one or more of the techniques or functions described herein. The instructions 1424 may also reside, completely or at least partially, within the main memory 1404, within static memory 1406, or within the hardware processor 1402 during execution thereof by the machine 1400. In an example, one or any combination of the hardware processor 1402, the main memory 1404, the static memory 1406, or the storage device 1416 may constitute machine readable media.

Specific examples of machine-readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 1422 is illustrated as a single medium, the term "machine readable medium" may include a single medium or multiple media (e.g., a centralized or distributed database, and/or associated caches and servers) configured to store the one or more instructions 1424.

An apparatus of the machine 1400 may be one or more of a hardware processor 1402 (e.g., a central processing unit (CPU), a graphics processing unit (GPU), a hardware processor core, or any combination thereof), a main memory 1404 and a static memory 1406, sensors 1421, network interface device 1420, antennas 1460, a display device 1410, an input device 1412, a UI navigation device 1414, a mass storage 1416, instructions 1424, a signal generation device 1418, and an output controller 1428. The apparatus may be configured to perform one or more of the methods and/or operations disclosed herein. The apparatus may be intended as a component of the machine 1400 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 1400 and that cause the machine 1400 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine-readable media. In some examples, machine readable media may include machine readable media that is not a transitory propagating signal.

The instructions 1424 may further be transmitted or received over a communications network 1426 using a transmission medium via the network interface device 1420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 1420 may include one or more physical jacks (e.g., Ethernet, coaxial, or phone jacks) or one or more antennas to connect to the communications network 1426. In an example, the network interface device 1420 may include one or more antennas 1460 to wirelessly communicate using at least one of single-input multiple-output (SIMO), multiple-input multiple-output (MIMO), or multiple-input single-output (MISO) techniques. In some examples, the network interface device 1420 may wirelessly communicate using Multiple User MIMO techniques. The term "transmission medium" shall be taken to include any intangible medium that is capable of storing, encoding or carrying instructions for execution by the machine 1300, and includes digital or analog communications signals or other intangible medium to facilitate communication of such software. In another embodiment, (not shown), the network interface device 1420 is connected/coupled directly to the network 1426, Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Example 1 is a method, comprising: assigning, based on a criterion, a plurality of log messages to a first message block; generating, based on contents of the messages assigned to the first message block, a message block vector in a vector space; determining a position of the message block vector in the vector space is within a defined volume in the vector space, the defined volume associated with an action; performing the action based on the determining.

In Example 2, the subject matter of Example 1 optionally includes generating for each log message of the plurality of log messages, a message vector, wherein the generation of the message block vector is based on each of the message vectors.

In Example 3, the subject matter of any one or more of Examples 1-2 optionally include receiving a first log message; assigning the first log message to a second message block; generating, based on the assignment, a second message block vector in the vector space based on messages assigned to the second message block including the first log message; second determining a second position of the second message block vector in the vector space is not within a defined volume in the vector space; and inhibiting performance of any remedial action in response to the second determining.

In Example 4, the subject matter of Example 3 optionally includes assigning, based on a second criterion, a second plurality of messages to the second message block; generating a third message block vector based on the second plurality of messages and the first log message; third determining a third position of the third message block vector in the vector space is within a second defined volume in the vector space; and selectively performing a second action associated with the second volume in response to the third determining.

In Example 5, the subject matter of any one or more of Examples 3-4 optionally include stripping information from the first log message, wherein the generation of the second message block vector is based on the stripped log message.

In Example 6, the subject matter of any one or more of Examples 1-5 optionally include wherein the generation of the message block vector comprises providing contents of the plurality of log messages to a machine learning algorithm, and the machine learning algorithm outputs the message block vector.

In Example 7, the subject matter of Example 6 optionally includes Word2Vec( ) or Doc2Vec( ).

In Example 8, the subject matter of any one or more of Examples 1-7 optionally include wherein the criterion identifies log messages generated within a time window or log messages including a plurality of keywords.

In Example 9, the subject matter of any one or more of Examples 1-8 optionally include wherein the remedial action restarts a computer, upgrades software of a network device, changes operating parameters of a network device, or annotates an issue report in an issue tracking database.

In Example 10, the subject matter of any one or more of Examples 1-9 optionally include first determining a first log message does not meet the criterion, and second determining the first log message meets a second criterion associated with a second message block, and associating the first log message with the second message block in response to the first determining and the second determining.

Example 11 is a non-transitory computer readable storage medium comprising instructions that when executed configure hardware processing circuitry to perform operations, comprising: assigning, based on a criterion, a plurality of log messages to a first message block; generating, based on contents of the messages assigned to the first message block, a message block vector in a vector space; determining a position of the message block vector in the vector space is within a defined volume in the vector space, the defined volume associated with an action; performing the action based on the determining.

In Example 12, the subject matter of Example 11 optionally includes the operations further comprising generating for each log message of the plurality of log messages, a message vector, wherein the generation of the message block vector is based on each of the message vectors.

In Example 13, the subject matter of any one or more of Examples 11-12 optionally include the operations further comprising: receiving a first log message; assigning the first log message to a second message block; generating, based on the assignment, a second message block vector in the vector space based on messages assigned to the second message block including the first log message; second determining a second position of the second message block vector in the vector space is not within a defined volume in the vector space; and inhibiting performance of any remedial action in response to the second determining.

In Example 14, the subject matter of Example 13 optionally includes the operations further comprising: assigning, based on a second criterion, a second plurality of messages to the second message block; generating a third message block vector based on the second plurality of messages and the first log message; third determining a third position of the third message block vector in the vector space is within a second defined volume in the vector space; and selectively performing a second action associated with the second volume in response to the third determining.

In Example 15, the subject matter of any one or more of Examples 13-14 optionally include the operations further comprising stripping information from the first log message, wherein the generation of the second message block vector is based on the stripped log message.

In Example 16, the subject matter of any one or more of Examples 11-15 optionally include wherein the generation of the message block vector comprises providing contents of the plurality of log messages to a machine learning algorithm, and the machine learning algorithm outputs the message block vector.

In Example 17, the subject matter of Example 16 optionally includes Word2Vec( ) or Doc2Vec( ).

In Example 18, the subject matter of any one or more of Examples 11-17 optionally include wherein the criterion identifies log messages generated within a time window or log messages including a plurality of keywords.

In Example 19, the subject matter of any one or more of Examples 11-18 optionally include wherein performing the remedial action restarts a computer, upgrades software of a network device, changes operating parameters of a network device, or annotates an issue report in an issue tracking database.

In Example 20, the subject matter of any one or more of Examples 11-19 optionally include the operations further comprising first determining a first log message does not meet the criterion, and second determining the first log message meets a second criterion associated with a second message block, and associating the first log message with the second message block in response to the first determining and the second determining.

Example 21 is an apparatus, comprising: means for assigning, based on a criterion, a plurality of log messages to a first message block; means for generating, based on contents of the messages assigned to the first message block, a message block vector in a vector space; means for determining a position of the message block vector in the vector space is within a defined volume in the vector space, the defined volume associated with an action; means for performing the action based on the determining.

In Example 22, the subject matter of Example 21 optionally includes means for generating for each log message of the plurality of log messages, a message vector, wherein the generation of the message block vector is based on each of the message vectors.

In Example 23, the subject matter of any one or more of Examples 21-22 optionally include means for receiving a first log message; means for assigning the first log message to a second message block, means for generating, based on the assignment, a second message block vector in the vector space based on messages assigned to the second message block including the first log message; means for second determining a second position of the second message block vector in the vector space is not within a defined volume in the vector space; and means for inhibiting performance of any remedial action in response to the second determining.

In Example 24, the subject matter of Example 23 optionally includes means for assigning, based on a second criterion, a second plurality of messages to the second message block; means for generating a third message block vector based on the second plurality of messages and the first log message; means for third determining a third position of the third message block vector in the vector space is within a second defined volume in the vector space; and means for selectively performing a second action associated with the second volume in response to the third determining.

In Example 25, the subject matter of any one or more of Examples 23-24 optionally include means for stripping information from the first log message, wherein the means for generation of the second message block vector is configured to base the generation on the stripped log message.

In Example 26, the subject matter of any one or more of Examples 21-25 optionally include wherein the means for generating the message block vector is configured to provide contents of the plurality of log messages to a machine learning algorithm, and the machine learning algorithm outputs the message block vector.

In Example 27, the subject matter of Example 26 optionally includes Word2Vec( ) or Doc2Vec( ).

In Example 28, the subject matter of any one or more of Examples 21-27 optionally include wherein the criterion identifies log messages generated within a time window or log messages including a plurality of keywords.

In Example 29, the subject matter of any one or more of Examples 21-28 optionally include wherein the means for performing the remedial action is configured to restart a computer, upgrade software of a network device, change operating parameters of a network device, or annotate an issue report in an issue tracking database.

In Example 30, the subject matter of any one or more of Examples 21-29 optionally include means for first determining a first log message does not meet the criterion, and means for second determining the first log message meets a second criterion associated with a second message block, and means for associating the first log message with the second message block in response to the first log message meeting the second criterion.

Example 31 is a system, comprising: hardware processing circuitry; one or more hardware memories storing instructions that when executed configure hardware processing circuitry to perform operations comprising: assigning, based on a criterion, a plurality of log messages to a first message block; generating, based on contents of the messages assigned to the first message block, a message block vector in a vector space; determining a position of the message block vector in the vector space is within a defined volume in the vector space, the defined volume associated with an action; performing the action based on the determining.

In Example 32, the subject matter of Example 31 optionally includes generating for each log message of the plurality of log messages, a message vector, wherein the generation of the message block vector is based on each of the message vectors.

In Example 33, the subject matter of any one or more of Examples 31-32 optionally include receiving a first log message; assigning the first log message to a second message block; generating, based on the assignment, a second message block vector in the vector space based on messages assigned to the second message block including the first log message; second determining a second position of the second message block vector in the vector space is not within a defined volume in the vector space; and inhibiting performance of any remedial action in response to the second determining.

In Example 34, the subject matter of Example 33 optionally includes assigning, based on a second criterion, a second plurality of messages to the second message block; generating a third message block vector based on the second plurality of messages and the first log message; third determining a third position of the third message block vector in the vector space is within a second defined volume in the vector space; and selectively performing a second action associated with the second volume in response to the third determining.

In Example 35, the subject matter of any one or more of Examples 33-34 optionally include stripping information from the first log message, wherein the generation of the second message block vector is based on the stripped log message.

In Example 36, the subject matter of any one or more of Examples 31-35 optionally include wherein the generation of the message block vector comprises providing contents of the plurality of log messages to a machine learning algorithm, and the machine learning algorithm outputs the message block vector.

In Example 37, the subject matter of Example 36 optionally includes Word2Vec( ) or Doc2Vec( ).

In Example 38, the subject matter of any one or more of Examples 31-37 optionally include wherein the criterion identifies log messages generated within a time window or log messages including a plurality of keywords.

In Example 39, the subject matter of any one or more of Examples 31-38 optionally include wherein the remedial action restarts a computer, upgrades software of a network device, changes operating parameters of a network device, or annotates an issue report in an issue tracking database.

In Example 40, the subject matter of any one or more of Examples 31-39 optionally include first determining a first log message does not meet the criterion, and second determining the first log message meets a second criterion associated with a second message block, and associating the first log message with the second message block in response to the first determining and the second determining.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Example embodiments may be implemented in digital electronic circuitry, or in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim.

What is claimed is:

1. A method, comprising:
   storing, in a data store of a network management system that manages a plurality of access point (AP) devices in a wireless network, a plurality of associations between multi-dimensional volumes within a vector space and corresponding remedial actions;
   evaluating, by at least one processor of the network management system, a plurality of sequential log messages received from at least one of the plurality of AP devices against a first criterion, wherein the plurality of sequential log messages are indicative of operational behavior of the wireless network;
   assigning, by the at least one processor and based on the first criterion, a first portion of the plurality of sequential log messages to a first message block;
   generating, by the at least one processor and based on contents of the first portion of the plurality of sequential log messages assigned to the first message block, a plurality of values for a corresponding plurality of dimensions of a message block vector within a vector space, each value of each dimension based on each of the sequential log messages included in the first portion;
   determining, by the at least one processor, the message block vector is within one of the multi-dimensional volumes;
   in response to determining that the message block vector is within one of the multi-dimensional volumes, automatically invoking, by the at least one processor, a remedial action associated with the one of the multi-dimensional volumes, wherein the remedial action includes automatically reconfiguring operation of at least one of the plurality of AP devices
   determining, by the at least one processor, a first log message does not meet the first criterion;
   determining, by the at least one processor, the first log message meets a second criterion associated with a second message block; and
   in response to determining the first log message meets the second criterion, associating, by the at least one processor, the first log message with the second message block.

2. The method of claim 1, further comprising generating, by the at least one processor, for each log message of the plurality of sequential log messages, a message vector, the generating based on a frequency of the log message, and a timing between the log message and a preceding log message in the sequence of log messages.

3. The method of claim 1, further comprising:
   receiving, by the at least one processor, a first log message;
   assigning, by the at least one processor, the first log message to a second message block;
   generating, by the at least one processor and based on the assignment, a second message block vector in the vector space based on messages assigned to the second message block including the first log message;
   in response to determining a second position of the second message block vector is not within a defined volume in the vector space, inhibiting, by the at least one processor, performance of any remedial action in response to the second determining.

4. The method of claim 3, further comprising:
   assigning, by the at least one processor and based on a second criterion, a second plurality of messages to the second message block;
   generating, by the at least one processor, a third message block vector based on the second plurality of messages and the first log message;
   in response to determining a third position of the third message block vector is within a second defined volume in the vector space, performing a second remedial action associated with the second defined volume.

5. The method of claim 1, wherein the generation of the message block vector comprises providing contents of the first portion of the plurality of sequential log messages to a machine learning algorithm, the machine learning algorithm considers a sequence of the plurality of log messages, and the machine learning algorithm outputs, based on the sequence, the message block vector.

6. The method of claim 1, further comprising:
assigning, by the at least one processor and based on the evaluation of the first criterion, a second portion of the plurality of sequential log messages to a second message block;
generating, by the at least one processor and based on contents of the second portion of the plurality of sequential log messages assigned to the second message block, a plurality of second values for a corresponding plurality of dimensions of a second message block vector within the vector space; and
in response to determining the second message block vector is within a second of the multi-dimensional volumes, automatically invoking a second remedial action associated with the second multi-dimensional volume.

7. A non-transitory computer readable storage medium comprising instructions that when executed configure hardware processing circuitry to:
store, in a data store of a network management system that manages a plurality of access point (AP) devices in a wireless network, a plurality of associations between multi-dimensional volumes within a vector space and corresponding remedial actions;
evaluate a plurality of sequential log messages received from at least one of the plurality of AP devices against a first criterion, wherein the plurality of sequential log messages are indicative of operational behavior of the wireless network;
assign, based on the first criterion, a first portion of the plurality of sequential log messages to a first message block;
generate, based on contents of the first portion of the plurality of sequential log messages assigned to the first message block, a plurality of values for a corresponding plurality of dimensions of a message block vector within a vector space, each value of each dimension based on each of the sequential log messages included in the first portion;
determining the message block vector is within one of the multi-dimensional volumes;
in response to determining that the message block vector is within one of the multi-dimensional volumes, automatically invoke a remedial action associated with the one of the multi-dimensional volumes, wherein the remedial action includes automatically reconfiguring operation of at least one of the plurality of AP devices;
determine a first log message does not meet the first criterion;
determine the first log message meets a second criterion associated with a second message block; and
in response to determining the first log message meets the second criterion, associate the first log message with the second message block.

8. The non-transitory computer readable storage medium of claim 7 further comprising instructions that when executed configure the hardware processing circuitry to generate, for each log message of the plurality of sequential log messages, a multi-dimensional message vector, wherein generation of the message block vector includes averaging corresponding dimensions of each of the multi-dimensional message vectors.

9. The non-transitory computer readable storage medium of claim 7 further comprising instructions that when executed configure the hardware processing circuitry to:

receive a first log message;
assign the first log message to a second message block;
generate, based on the assignment, a second message block vector in the vector space based on messages assigned to the second message block including the first log message;
in response to determining a second position of the second message block vector is not within a defined volume in the vector space, inhibit performance of any remedial action.

10. The non-transitory computer readable storage medium of claim 9, further comprising instructions that when executed configure the hardware processing circuitry to:
assign, based on a second criterion, a second plurality of messages to the second message block;
generate a third message block vector based on the second plurality of messages and the first log message;
in response to determining a third position of the third message block vector is within a second defined volume in the vector space, perform a second remedial action associated with the second defined volume.

11. A system, comprising:
a plurality of access point (AP) devices in a wireless network; and
a network management system comprising:
a memory storing a plurality of associations between multi-dimensional volumes within a vector space and corresponding remedial actions; and
at least one processor coupled to the memory and configured to:
evaluate a plurality of sequential log messages received from the plurality of AP devices against a first criterion, wherein the plurality of sequential log messages are indicative of operational behavior of the wireless network;
assign, based on the first criterion, a first portion of the plurality of sequential log messages to a first message block;
generate, based on contents of the first portion of the plurality of sequential log messages assigned to the first message block, a plurality of values for a corresponding plurality of dimensions of a message block vector within a vector space, each value of each dimension based on each of the sequential log messages included in the first portion;
determine whether the message block vector is within one of the multi-dimensional volumes;
in response to determining that the message block vector is within one of the multi-dimensional volumes, automatically invoke a remedial action associated with the one of the multi-dimensional volumes, wherein the remedial action includes automatically reconfiguring operation of at least one of the plurality of AP devices;
determine a first log message does not meet the first criterion;
determine the first log message meets a second criterion associated with a second message block; and
in response to determining the first log message meets the second criterion, associate the first log message with the second message block.

12. The system of claim 11, wherein the at least one processor is further configured to:
generate, for each log message of the plurality of sequential log messages, a message vector based on a frequency of the message and a timing between the message and a preceding log message in the sequence of log messages.

13. The system of claim 11, wherein the at least one processor is further configured to:
    receive a first log message;
    assign the first log message to a second message block;
    generate, based on the assignment, a second message block vector in the vector space based on messages assigned to the second message block including the first log message;
    in response to determining a second position of the second message block vector is not within a defined volume in the vector space, inhibit performance of any remedial action.

14. The system of claim 13, wherein the at least one processor is further configured to:
    assign, based on a second criterion, a second plurality of messages to the second message block;
    generate a third message block vector based on the second plurality of messages and the first log message;
    in response to determining a third position of the third message block vector is within a second defined volume in the vector space, perform a second remedial action associated with the second defined volume.

15. The system of claim 13, wherein the at least one processor is further configured to strip information from the first log message, wherein the generation of the second message block vector is based on the stripped log message.

16. The system of claim 11, wherein the generation of the message block vector comprises providing contents of the first portion of the plurality of sequential log messages to a machine learning algorithm, the machine learning algorithm considers a sequence of the plurality of log messages, and the machine learning algorithm outputs, based on the sequence, the message block vector.

17. The system of claim 16, wherein the machine learning algorithm comprises one of Word2Vec( ) or Doc2Vec( ).

18. The system of claim 11, wherein the first criterion identifies log messages generated within a time window or log messages including a plurality of keywords.

19. The system of claim 11, wherein to automatically invoke the remedial action, the at least one processor is further configured to at least one of automatically restart a computer, upgrade software of a network device, change operating parameters of a network device, or annotate an issue report in an issue tracking database.

20. A system, comprising:
    a plurality of access point (AP) devices in a wireless network; and
    a network management system comprising:
    a memory storing a plurality of associations between multi-dimensional volumes within a vector space and corresponding remedial actions; and
    at least one processor coupled to the memory and configured to:
        evaluate a plurality of sequential log messages received from the plurality of AP devices against a first criterion, wherein the plurality of sequential log messages are indicative of operational behavior of the wireless network;
        assign, based on the first criterion, a first portion of the plurality of sequential log messages to a first message block;
        generate, based on contents of the first portion of the plurality of sequential log messages assigned to the first message block, a plurality of values for a corresponding plurality of dimensions of a message block vector within a vector space, each value of each dimension based on each of the sequential log messages included in the first portion;
        determine whether the message block vector is within one of the multi-dimensional volumes;
        in response to determining that the message block vector is within a first of the multi-dimensional volumes, automatically invoke a first remedial action associated with the one of the multi-dimensional volumes, wherein the first remedial action includes automatically reconfiguring operation of at least one of the plurality of AP devices;
        assign, based on the evaluation of the first criterion, a second portion of the plurality of sequential log messages to a second message block;
        generate, based on contents of the second portion of the plurality of sequential log messages assigned to the second message block, a plurality of second values for a corresponding plurality of dimensions of a second message block vector within the vector space;
        determine that the second message block vector is within a second of the multi-dimensional volumes;
        determine, based on the second multi-dimensional volume, an associated second remedial action; and
        automatically invoke the second remedial action.

21. A method, comprising:
    storing, in a data store of a network management system that manages a plurality of access point (AP) devices in a wireless network, a plurality of associations between multi-dimensional volumes within a vector space and corresponding remedial actions;
    evaluating, by at least one processor of the network management system, a plurality of sequential log messages received from at least one of the plurality of AP devices against a first criterion, wherein the plurality of sequential log messages are indicative of operational behavior of the wireless network;
    assigning, by the at least one processor and based on the first criterion, a first portion of the plurality of sequential log messages to a first message block;
    generating, by the at least one processor and based on contents of the first portion of the plurality of sequential log messages assigned to the first message block, a plurality of values for a corresponding plurality of dimensions of a message block vector within a vector space, each value of each dimension based on each of the sequential log messages included in the first portion;
    determining, by the at least one processor, the message block vector is within one of the multi-dimensional volumes;
    in response to determining that the message block vector is within one of the multi-dimensional volumes, automatically invoke, by the at least one processor, a remedial action associated with the one of the multi-dimensional volumes, wherein the remedial action includes automatically reconfiguring operation of at least one of the plurality of AP devices;
    assigning, by the at least one processing and based on the evaluation of the first criterion, a second portion of the plurality of sequential log messages to a second message block;
    generating, by the at least one processor and based on contents of the second portion of the plurality of sequential log messages assigned to the second message block, a plurality of second values for a corresponding plurality of dimensions of a second message block vector within the vector space;

determining, by the at least one processor, that the second message block vector is within a second of the multi-dimensional volumes;

determining, by the at least one processor and based on the second multi-dimensional volume, an associated second remedial action; and automatically invoking, by the at least one processor, the second remedial action.

* * * * *